US00RE36847E

United States Patent [19]

Waters

[11] E Patent Number: Re. 36,847

[45] Reissued Date of Patent: Sep. 5, 2000

[54] AUTOMATED SELF-CLEANING LITTER BOX FOR CATS

[75] Inventor: Michael A. Waters, Barrington Hills, Ill.

[73] Assignee: Waters Research Company, Elgin, Ill.

[21] Appl. No.: 08/997,879

[22] Filed: Dec. 24, 1997

Related U.S. Patent Documents

Reissue of:

[64] Patent No.: 5,477,812
Issued: Dec. 26, 1995
Appl. No.: 08/371,782
Filed: Jan. 12, 1995

[51] Int. Cl.[7] ..... A01K 1/035

[52] U.S. Cl. ..... 119/163; 119/166

[58] Field of Search ..... 119/161, 163, 119/164, 165, 166

[56] References Cited

U.S. PATENT DOCUMENTS

| | | | |
|---|---|---|---|
| 3,734,057 | 5/1973 | Lee et al. . | |
| 3,811,410 | 5/1974 | Roberts . | |
| 4,011,836 | 3/1977 | Temel . | |
| 4,011,837 | 3/1977 | Ksioszk . | |
| 4,096,827 | 6/1978 | Cotter . | |
| 4,098,229 | 7/1978 | Haynes et al. . | |
| 4,117,804 | 10/1978 | Moore . | |
| 4,190,525 | 2/1980 | Menzel . | |
| 4,325,325 | 4/1982 | Larter . | |
| 4,325,822 | 4/1982 | Miller . | |
| 4,574,735 | 3/1986 | Hohenstein | 119/166 |
| 4,658,720 | 4/1987 | Massonnet . | |
| 4,729,342 | 3/1988 | Loctin . | |
| 4,844,011 | 7/1989 | Strickland | 119/164 |
| 4,846,104 | 7/1989 | Pierson, Jr. | 119/166 |
| 4,854,267 | 8/1989 | Morrow . | |
| 4,934,317 | 6/1990 | Pourshalchi . | |
| 4,949,672 | 8/1990 | Yamamoto | 119/169 |
| 4,949,673 | 8/1990 | Yamamoto . | |
| 5,048,463 | 9/1991 | Wilson et al. . | |
| 5,048,465 | 9/1991 | Carlisi | 119/161 |
| 5,107,797 | 4/1992 | LaRoche . | |
| 5,184,575 | 2/1993 | Reinartz . | |
| 5,188,062 | 2/1993 | Joy et al. . | |
| 5,226,388 | 7/1993 | McDaniel | 119/166 |
| 5,249,549 | 10/1993 | Rockaitis, III . | |
| 5,259,340 | 11/1993 | Arbogast | 119/166 |
| 5,267,530 | 12/1993 | Zamoyski | 119/166 |
| 5,279,258 | 1/1994 | Kakuta . | |
| 5,511,513 | 4/1996 | Baron et al. . | |
| 5,544,620 | 8/1996 | Sarkissian . | |
| 5,564,364 | 10/1996 | Kovacs et al. . | |
| 5,592,900 | 1/1997 | Kakuta . | |

FOREIGN PATENT DOCUMENTS

| | | | |
|---|---|---|---|
| 2069517 | 11/1993 | Canada | 119/161 |
| 0 154 540 | 4/1985 | European Pat. Off. . | |
| 154540 | 9/1985 | European Pat. Off. | 119/166 |
| 0 297 015 | 4/1988 | European Pat. Off. . | |

*Primary Examiner*—Todd E. Manahan
*Attorney, Agent, or Firm*—Dickstein Shapiro Morin & Oshinsky LLP

[57] ABSTRACT

An improved automated self-cleaning litter box for cats, of the kind having a housing defining an upwardly open chamber for storage of a supply of cat litter, accessible to a cat and having path members on opposed side walls defining a comb path from one end of the chamber to the other. A comb, normally stored at the comb storage end of the chamber, is driven forward along the path to the discharge end of the chamber and back to its original storage position. As the comb traverses the chamber forwardly it engages any clumps of waste in the litter and carries them to a disposal receptacle at the discharge end of the chamber. The improvement includes a sensor for sensing the presence of a cat in the litter chamber; a photo electric sensor is preferred, but an infra red, weight, or even an audible sensor can be used. A delay device actuates the comb drive a predetermined time interval after the sensor ceases to sense the presence of a cat in the litter chamber. In the improved construction the comb path includes multi-perforate track members on opposite sides of the litter chamber; those tracks are engaged by rotatable drive wheels connected to the comb. The comb drive includes a reversible electric motor, mounted on the same carriage as the comb. A transparent, biodegradable receptacle is used; alarms for a full receptacle and for an insufficient litter supply are provided.

48 Claims, 7 Drawing Sheets

AUTOMATED SELF-CLEANING LITTER BOX FOR CATS

Matter enclosed in heavy brackets [ ] appears in the original patent but forms no part of this reissue specification; matter printed in italics indicates the additions made by reissue.

BACKGROUND OF THE INVENTION

Cats, which are among the most popular types of domestic pets, are usually trained to use a litter box for elimination of both liquid and solid wastes. A cat litter box is normally made of plastic or like material so that a cat's urine will not leak through the box. Other types of cat litter box have been proposed, as in the construction described in Rockaitis U.S. Pat. No. 5,249,549, in which the litter box is made of a material that absorbs liquid but does not permit it to leach through to the exterior of the box. The litter used in boxes of this kind may be one of any number of particulate litter materials that absorb moisture from the waste of the cat and that may also suppress odor from cat wastes. Some forms of cat litter form clumps when wet. Usually, a cat will bury its solid waste in the litter material in the box.

Most cat owners take appropriate action to discard the litter from cat litter box after an appreciable period of time, often several days. On the other hand, even before the litter has been thoroughly saturated with wastes from the cat or cats that use it, a cat may be inclined to push some of the litter out of the box, particularly if the odor is strong. In any event, the person using a cat litter box, usually the owner of the cat or cats, may find the task of emptying the cat litter to be personally obnoxious. Thus, a number of prior art devices have been proposed for cleaning cat litter boxes; devices of this kind are disclosed in U.S. Pat. No. 4,096,827, No. 4,117,804, No. 4,190,525, No. 4,325,325, No. 4,325,822, and No. 5,226,388. Perhaps the best of these devices is disclosed in Carlisi U.S. Pat. No. 5,048,465.

The self-cleaning cat litter box disclosed in the Carlisi patent utilizes a rake or comb that is normally maintained in a storage position at one end of the litter chamber. This comb is moved through the litter, periodically, from the rake storage end of the chamber to the opposite end, which constitutes a discharge end for the chamber. At the discharge end of the chamber the rake moves up out of the litter and discharges any clumps collected by the comb into a disposal receptacle. The present invention provides effective improvement for the rake drive of the Carlisi device so that movement of the comb or rake through the litter can be made responsive to entry and exit of the cat from the litter box. Cats are no more constant in their elimination habits than human beings; periodic cleaning may be inappropriate. The invention also provides for improvements in the disposal receptacle, which may also serve as a container for a new litter supply. Alarms are also provided for an insufficient litter supply and a full disposal receptacle.

SUMMARY OF THE INVENTION

It is a principal object of the present invention, therefore, to provide a new and improved drive for a rake or comb employed to remove litter from a cat litter box, a drive that is directly responsive to the exit of a cat from the litter box.

Another object of the invention is to provide a new and improved drive for a self-cleaning cat litter box that is capable of remaining in, operation for extended periods of time without attention from the cat owner and that does not operate on a periodical basis so that there is no substantial possibility that the comb mechanism will carry out a cleaning operation while a cat is present in the litter box.

Another object of the present invention is to provide a new and improved drive for an automated self-cleaning cat litter box that is simple and economical in construction and that can afford an extended operating life, requiring little or no attention apart from battery replacement.

Further objects of the invention are to provide an improved waste receptacle, an alarm signalling an inadequate litter supply in the litter box, and an alarm signalling that the waste receptacle is full.

DESCRIPTION OF THE PREFERRED EMBODIMENT

Figure 1:
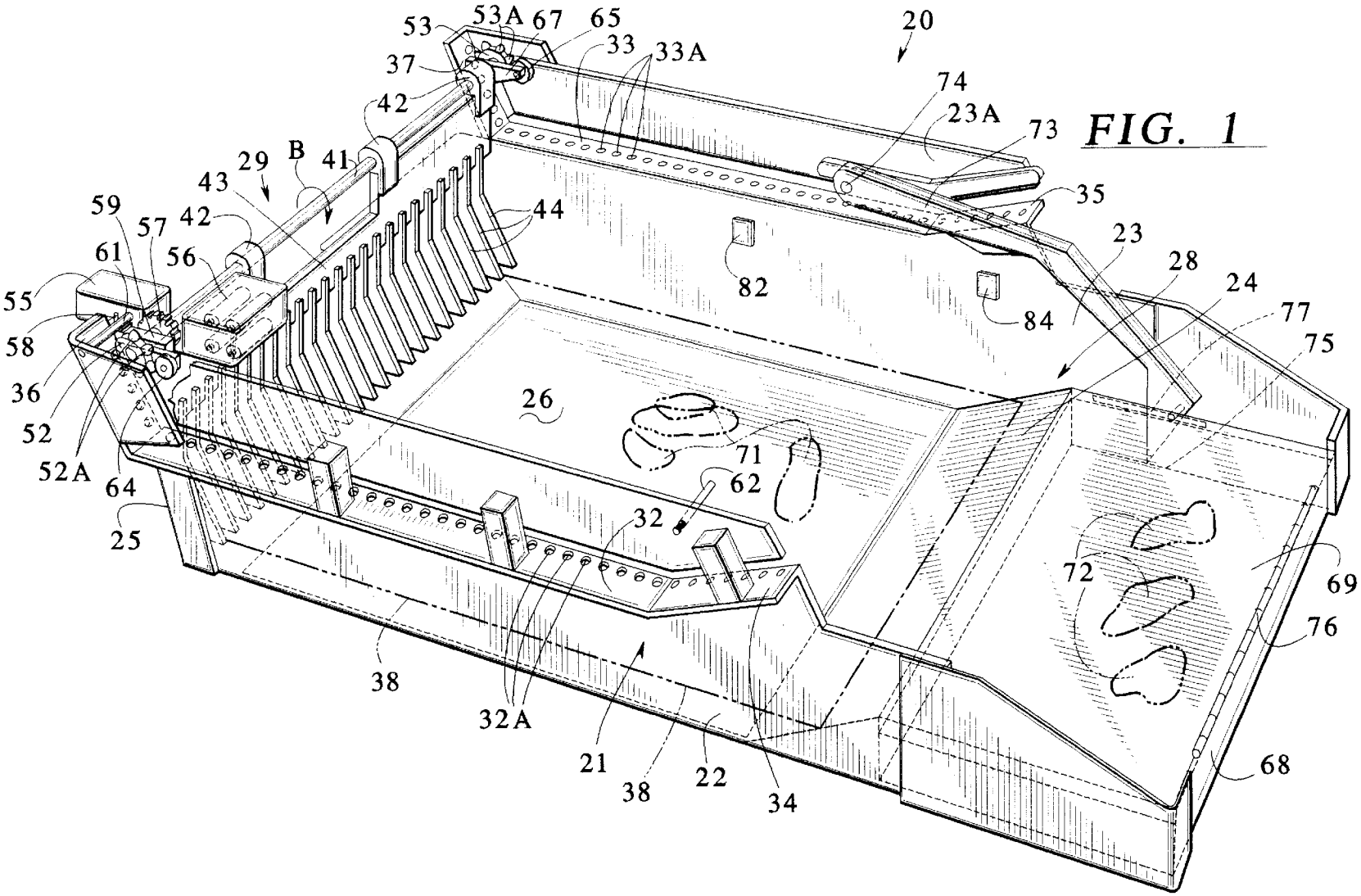
FIGS. 1, 2 and 3 are perspective views of an automated self-cleaning litter box for use by a cat, constructed in accordance with a preferred embodiment of the invention, showing the litter box at three distinct stages of operation.
Figure 2:
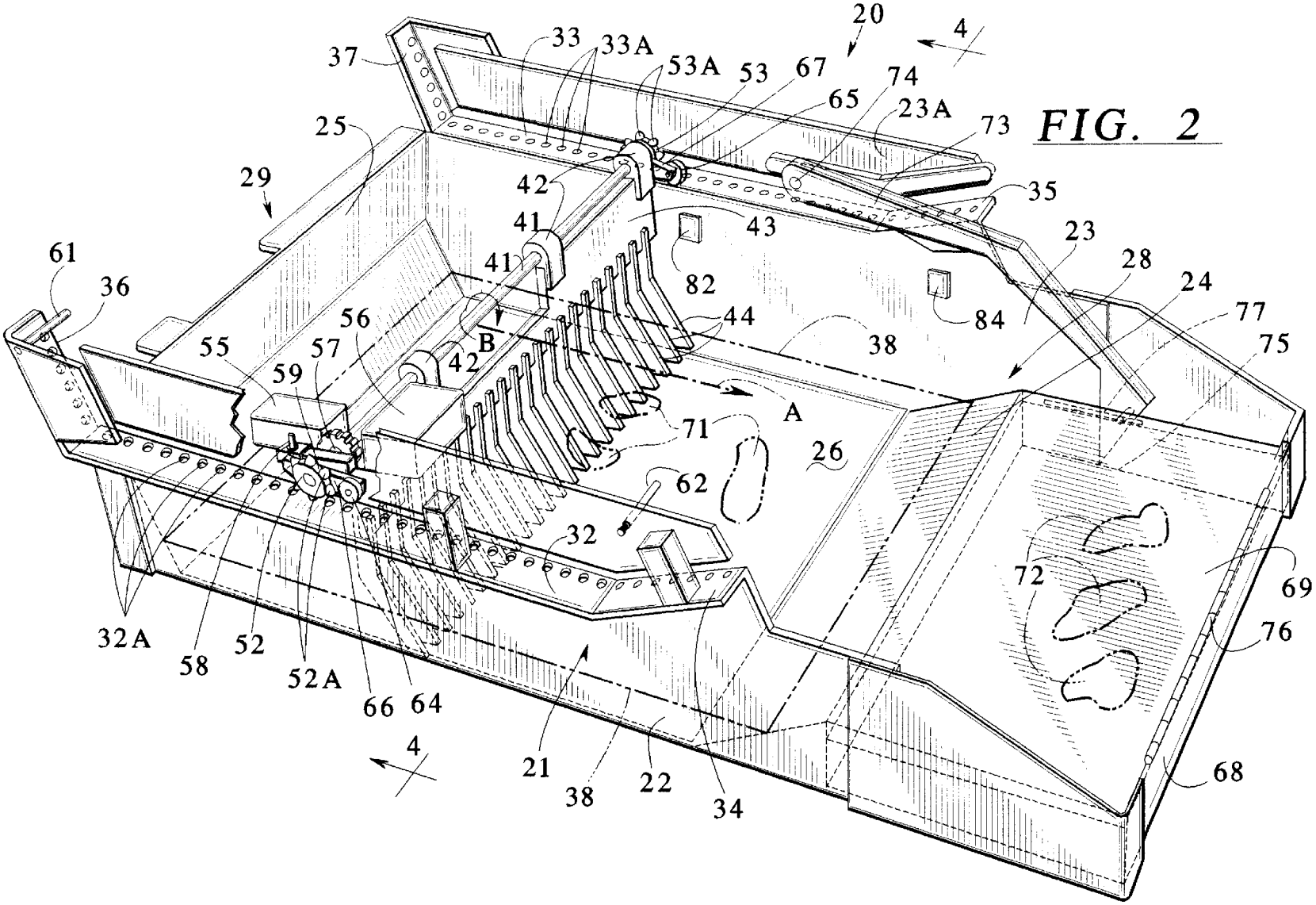
Figure 3:
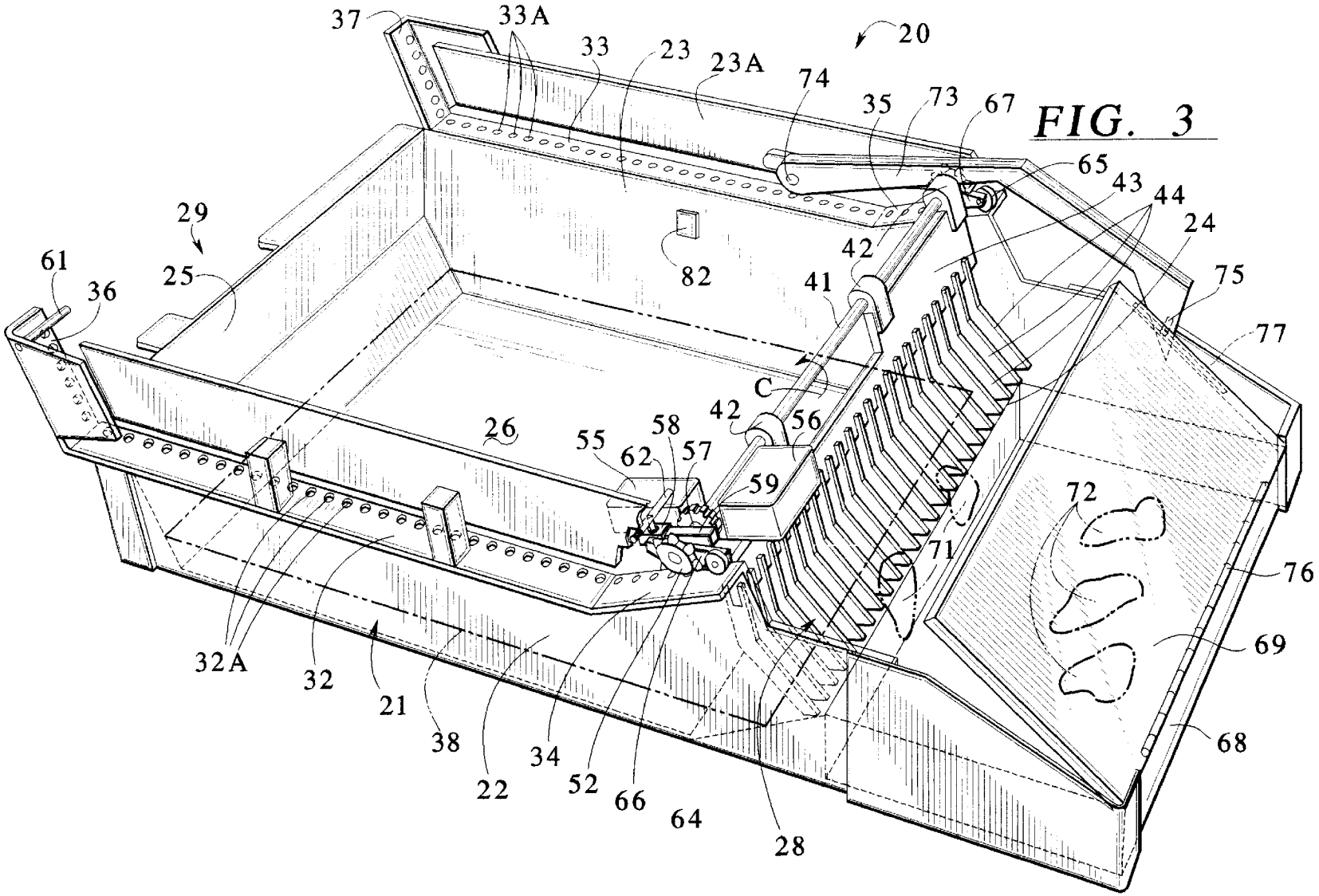

FIGS. 1–3 illustrate successive positions for the operating mechanism of la cat litter box 20 that affords automated self-cleaning operation. Litter box 20 comprises a pan-shaped housing 21 having a near side wall 22, a far side wall 23, a discharge end wall 24 joining walls 22 and 23 at one end of the litter box and a comb storage end wall 25 connecting walls 22 and 23 at the other end of litter box 20. The bottom of litter box 20 is identified by reference numeral 26 and the fill level to which box 20 is usually filled with cat litter is shown by phantom line 38. Thus, in litter box 20 there is a discharge end 28 at one end of the litter box and a comb storage end 29 at the opposite end of the litter box. Litter level line 38 may be afforded by a continuous or interrupted ridge in the interior of housing 21, as discussed in regard to FIG. 8. All of the members 22–26 are preferably formed in a molding operation that produces the complete housing 21.

An elongated near Side track or path member 32 extends along the top of the near side wall 22 of housing 21, FIGS. 1–4. Track member 32 includes a multiplicity of equally spaced apertures 32A. Apertures 32A extend through an inclined portion 34 of rack 32 at the discharge end 28 of litter box 20; they also extend through a more steeply inclined portion 36 of rack 32 at the comb storage end 29 of the litter box. This track construction is repeated on the opposite side of housing 21. Thus, an elongated track member 33 projects horizontally from the vertical side wall 23. Track member 33 includes a multiplicity of equally spaced apertures or perforations 33A. The pattern of apertures extends along an inclined portion 35 of track member 33 at the discharge end 28 of litter box 20. It also extends along a more steeply inclined portion 37 of track 33 located at the comb discharge end 29 of litter box 20.

A comb shaft 41 extends across litter box 20 between its two side tracks 32 and 33. In FIG. 1 shaft 41 is located at the comb storage end 29 of the litter box. In FIG. 2 shaft 41 is positioned at about the middle of the litter box. In FIG. 3 shaft 41 is shown near the end of its movement at the discharge end 28 of litter box 20. There are four hangers 42 journalled on and depending from shaft 41; three of these hangers appear in FIGS. 1–3 and the fourth can be seen in FIG. 4. A comb or rake 43 is suspended from hangers 42. Comb 43 has a multiplicity of tines 44. When comb 43 is in its storage position, as shown in FIG. 1, tines 44 are elevated above the litter fill level 38. When rack 43 is moving across litter box 20, as indicated by arrow A in FIG. 2, the lower ends of the tines 44 project down into the litter in box 20, close to the bottom 26 of the box. See FIG. 4. At the discharge end of litter box 20, the tines 44 of comb 43 again move upwardly out of the litter.

A first main guide wheel 52 is affixed to the near end of shaft 41, as seen in FIGS. 1–3. Guide wheel 52 includes a plurality of radially projecting guide pins or teeth 52A engageable in the apertures 32A of track member 32 and its extensions 34 and 36. At the other end of shaft 41 there is a similar main guide wheel 53. The radial projections 53A on guide wheel 53 are engageable in the apertures 33A of track member 33 and its extensions 35 and 37. Guide wheels 52 and 53 cause the ends of shaft 41 to move along tracks 32 and 33, based on rotation of shaft 41, from the storage position of FIG. 1 through the intermediate position of FIG. 2 to the discharge position of FIG. 3 and back to the storage position, FIG. 1.

The improved self-cleaning cat litter box 20, FIGS. 1–3, includes a comb drive that comprises a reversible electric motor 55 mounted on and connected in driving relationship to the shaft 41 that supports comb 43; the final gear 57 of the gear train that connects motor 55 to shaft 41 is the only gear that appears in the drawings, FIGS. 1–3. In the construction illustrated in the drawings, motor 55 is energized from batteries contained in a battery case 56. Motor 55 and the gear train represented by gear 57, as well as battery case 56, are supported by shaft 41; in conjunction with the shaft, they constitute the carriage for the comb 43 in litter box 20. A reversing switch 58 is mounted on and electrically connected to motor 55. A lever 59 is mechanically connected to reversing switch 58. Lever 59 has a limited pivotal movement, from the position shown in FIG. 1 to the position illustrated in FIG. 2. A first switch actuation pin 61 is located adjacent the comb storage end 29 of litter box 20. A similar fixed switch actuation pin 62 is positioned at the other end, the discharge end 28, of litter box 20.

In addition to the main guide wheels 52 and 53 referred to above, the drive and guidance system of litter box 20 includes two auxiliary guide wheels 64 and 65, located on the near and far sides of the litter box, respectively, as seen in the drawings. Auxiliary guide wheel 64 is mounted at the end of a lever 66 that projects from one of the hangers 42 used to suspend comb 43 from shaft 41. Auxiliary guide wheel 64 rides along track 32 throughout the length of that track, including its upwardly inclined end sections 34 and 36. Similarly, the auxiliary guide wheel 65 is mounted on a lever 67 and engages the other track member 33 and its extensions 35 and 37. See FIG. 4.

As shown in FIGS. 1–3, the improved automated self-cleaning cat litter box 20 is provided with a waste receptacle 68 positioned immediately adjacent the discharge end 28 of the litter box. Receptacle 68 has a hinged lid 69. Waste receptacle 68 and its lid 69 are preferably formed of a biodegradable material. Moreover, receptacle 68 should be transparent; alternatively, lid 69 may be transparent or, of course, both may be transparent enough to permit the user to visually check the level of waste and litter in the receptacle. Lid 69 is engaged by a pin 75 on a lid lift lever 73 that is pivotally secured to a vertical extension 23A of side wall 23. The pivotal connection is indicated at 74. There need be no comparable lid lift mechanism 73–75 at the near side of the machine, though one could be provided if motor 55 and battery case 56 were mounted closer to the center of the litter box. In FIGS. 1 and 2 waste clumps 71 are indicated in the litter chamber; similar clumps 72 are shown, in FIGS. 1–3, as being already deposited in receptacle 68.

Waste receptacle 68 may be formed of plastic or other suitable material. The lid 69 for receptacle 68 is hinged to the receptacle as indicated at 76. A hinge of the so-called "piano" type may be used, but other hinge structures are acceptable. Lid 69 may also be formed of plastic. On the other hand, receptacle 68 and its lid 69 may be fabricated of other appropriate material. Preferably, receptacle 68 initially serves as a container for clean litter so that, once the receptacle is ready to be discarded, it can simply be removed and a new receptacle put in place after emptying clean litter from the new waste receptacle into the chamber afforded by housing 21.

Figure 4:
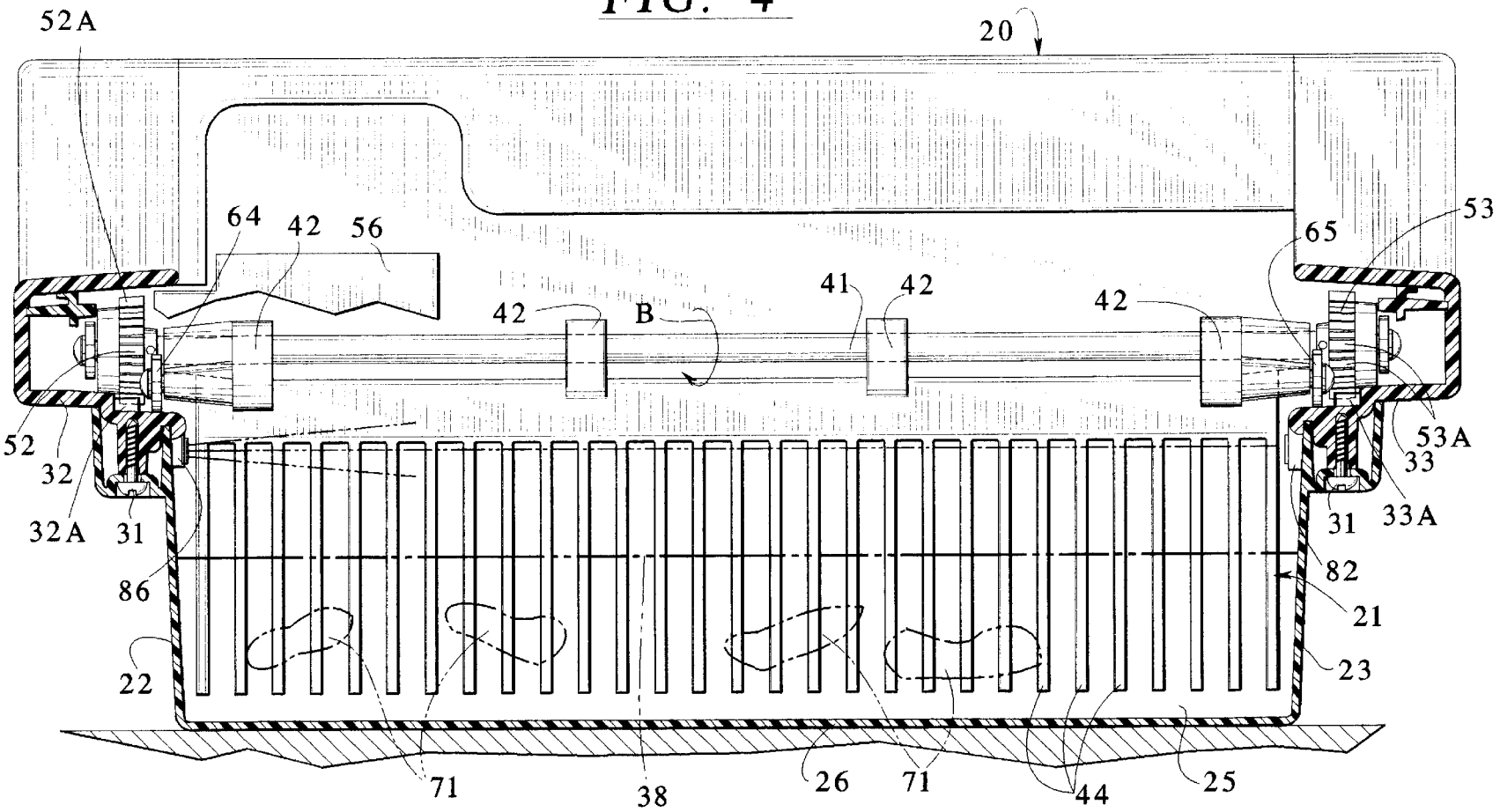
FIG. 4 is a transverse sectional view taken approximately along line 5—5 in FIG. 2.

The improved automated self-cleaning litter box 20 further comprises a sensor utilized to sense the exit of a cat from the litter chamber afforded by housing 21. In the embodiment of FIGS. 1–3 there are two such sensors 82 and 84, both mounted on wall 23 above the fill line 38 for litter. Devices 82 and 84 may comprise conventional photo detectors, each receiving a light beam from a source not shown in FIGS. 1–2. FIG. 4 shows an appropriate light source 86 mounted on wall 22 above fill level 38. Photo detector 82, FIG. 4, is also located above fill level 38. A single light source located centrally along the length of wall 22 can be used or there may be two such light sources 86, one for each of the photo detectors 82 or 84.

Figure 5:
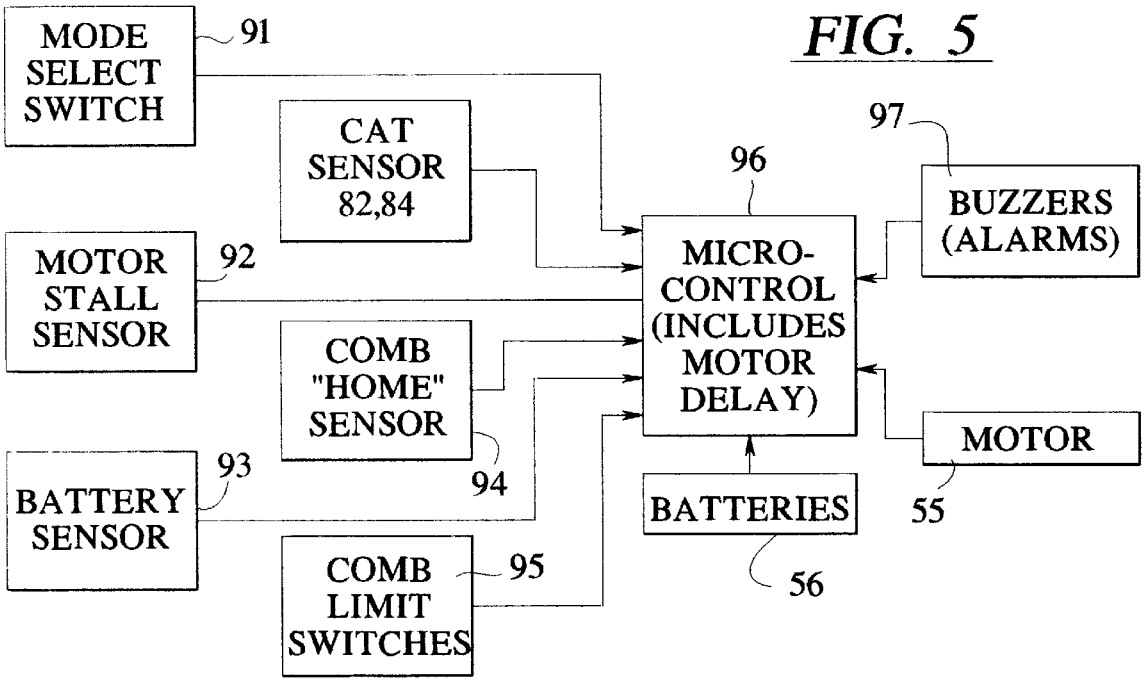
FIG. 5 is a block diagram of the drive and control for the litter box of FIGS. 1–3.

A block diagram for the operating circuit of the improved automated self-cleaning litter box 20 is presented in FIG. 5. As shown therein, motor 55 is energized from battery 56 through a pre-programmed micro-processor control 96. Micro control 96 receives input signals from cat sensors 82 and 84. Additional inputs to control 96 may be supplied by a mode select switch 91, a motor stall sensor 92, a battery voltage sensor 93, and a home position sensor 94 for comb 43. Limit switches 95 may be provided for the comb at the storage end 28 of litter box 20 and at the discharge end 29 of the litter box. One or more buzzers or other alarm devices 97 are included in the circuit so that the cat owner can be signalled when the litter box is functional or when other conditions occur, such as an insufficient litter supply in box 20 or a full waste receptacle 68. Circuit components 91–93 and buzzer 97 may all be packaged in the same housing with motor 55. Sensor 94 and limit switches 95 can be incorporated in litter box 20 in appropriate positions as desired.

In considering operation of the improved automated self-cleaning litter box 20 of FIGS. 1–4, the best starting point is FIG. 1, which shows the litter box in its normal condition, applicable most of the time. Comb 43 is located at the comb storage end 29 of litter box 20. Comb shaft 41 is elevated, guide wheels 52 and 53 having ridden up the extensions 36 and 37 of tracks 32 and 33. Switch 58 and lever 59 have engaged pin 61; motor 55 is shut off, but is set for forward movement. Housing 21 is filled with litter, approximately to level 38. Photo detectors 82 and 84 receive light beams from sources 86 on the near wall 22 of the litter box (see FIG. 4). With no cat present in the litter box, reception of the light beams by photo detectors 82 and 84 is unimpeded. All other mechanisms are in the positions shown. Lid 69 is closed over receptacle 68. The receptacle lid is engaged by pin 75 at the end of lever 73 but remains closed because the lid opening lever 73 is inactive.

At this juncture, it may be assumed that a cat (not illustrated) enters litter box 20 for the purpose of elimination of either liquid or solid waste. With some kinds of litter, the urine from the cat creates a clump in the litter with which the bottom portion of housing 21 is filled. Of course, for solid elimination, the clump is formed by the waste itself. In either instance, the cat is likely to bury the waste or to cover it with other litter. This is almost invariably true with respect to solid waste. Thus, clumps 71 are produced by the cat, and those clumps are located at some level in the litter above the bottom 26 of litter box 20. It is assumed that the box has previously been used and that previously deposited waste clumps 72 are already present in the waste receptacle 68.

While the cat is present in the litter box, the light beam to at least one of the photo detectors 82 and 84 is cut off. Usually, both light beams are blocked. However, this does not initiate a self-cleaning operation in litter box 20. Subsequently, when the Cat leaves the litter box the light beam or beams again impinge upon the photo detectors. Accordingly, an output signal from one or both cat sensors is supplied to micro control 96 (FIG. 5). At this point, however, there still is no actuation of a self-cleaning operation in box 20 by comb 43. The reason for the delay is that the cat might return to the litter box, deciding that its elimination activities have not been completed. In these circumstances, the light beams to one or both of the photo detectors 82 and 84 are again cut off and the preset delay interval for actuation of a self-cleaning operation is not completed.

Ultimately, the cat leaves litter box 20 for an interval long enough to exceed the preset time delay that is set into micro control 96. That time interval is subject to substantial variation; a range of two to seven minutes is usually desirable. The self-cleaning operation carried out by comb 43 should not be initiated while the cat is in the immediate vicinity because it is undesirable to cause the cat to have reason to be afraid of the litter box.

After the cat has left litter box 20 for a time exceeding the preset delay interval in micro control 96, FIG. 5, motor 55 is energized from battery 56 through microcontrol 96. As a consequence, gear 57 and shaft 41 are rotated in the direction of the arrow B in FIG. 1. The initial movement of the comb carriage comprising shaft 41, motor 55, and battery housing 56 is downwardly along track extensions 36 and 37. In the course of this downward movement of comb 43, its tines 44 are pushed downwardly into the litter in the bottom portion of housing 21, well below fill line 38. The bottoms of the tines, when this movement is completed, are quite close to the bottom 26 of the litter box housing but preferably don't quite engage the bottom of the housing; see FIG. 4.

Motor 55 remains energized and shaft 41 continues to rotate in the direction of arrow B. As a consequence, comb 43 is driven across the litter chamber defined by the housing 21 of box 20, from storage end 29 to discharge end 28, as indicated in FIG. 2 by arrow A. Reference may also be made to FIG. 4, where the position of the comb and its tines 44 are illustrated. As the comb moves across the litter box, in the direction of arrow A, tines 44 engage any clumps 71 present in the litter, whether generated by the elimination of liquid or solid wastes by the cat. Comb 43 carries those clumps toward the discharge position 28 at the far end of box 20, the right hand end of the litter box as seen in FIGS. 1 and 2. Comb 43 remains in a substantially erect position as shown in FIG. 2. It is prevented from rotating in the direction of arrow B by the engagement of auxiliary guide wheels 64 and 65 with tacks 32 and 33 respectively. The forward motion of the comb in the direction of arrow A is effected by rotation of shaft 41 in the direction of arrow B and the engagement of guide wheels 52 and 53 and their pins 52A and 53A in the apertures 32A and 33A of the two tracks 32 and 33 that define the comb path.

Ultimately, comb 48 advances to a position where its main guide wheels 52 and 53 reach the upwardly inclined extension portions 34 and 35 of tracks 32 and 33, respectively. Motor 55 is still energized; as a consequence, the carriage comprising shaft 41 moves up the ramps or track extensions 34 and 35 to the position shown in FIG. 3. During this upward movement of comb 43, lever 73 is engaged by the comb carriage and is pivoted upwardly from the original position shown in FIGS. 1 and 2 to the elevated position shown in FIG. 3. As a consequence, due to the engagement of pin 75 with a slot or like guide 77 in receptacle cover 69, cover 69 is opened, moving to the position shown in FIG. 3. When comb 43 reaches the discharge position shown in FIG. 3, the additional clumps 71 are discharged into receptacle 68 to join clumps 72 already present there.

When Comb 43 reaches the position of FIG. 3, it actuates one of the limit switches 95 of FIG. 5; the limit switch is not shown in the drawing and can be positioned to be actuated by any part of the comb or its carriage. The resulting output signal to micro control 96 (FIG. 5) reverses motor 55 and the motor starts to rotate shaft 41 in the direction of arrow C, FIG. 3. Accordingly, comb 43 is driven, by motor 55, back to its storage position illustrated in FIG. 1. In the process, discharge lever 73 is disengaged and drops back down to its original position, so that lid 69 on receptacle 68 again closes. The waste from litter box 20 is now totally enclosed in waste receptacle 68.

When comb 43 has finished its movement back to a point closely adjacent to storage end wall 25, its two main guide wheels 52 and 53 encounter the steeply inclined upward extensions 36 and 37 of tracks 32 and 33. Motor 55 remains energized and pulls comb 43 and its shaft 41 up to the position shown in FIG. 1. When the comb reaches that position, switch 58 is actuated by pin 61 and sets motor 55 for subsequent operation in the forward direction. When comb 43 reaches the end of its travel, at the position shown in FIG. 1, another of the comb limit switches 95 (FIG. 5) is actuated and a signal is supplied to micro control 96 to shut off the motor. A "home" sensor 94 may be provided for the same purpose. Usually, it is desirable to have both a home sensor 94 and a limit switch 95 (see FIG. 5) to actuate the micro control 96 and make sure that motor 55 is shut off with comb 43 at the storage position 29 shown in FIG. 1.

Figure 6:
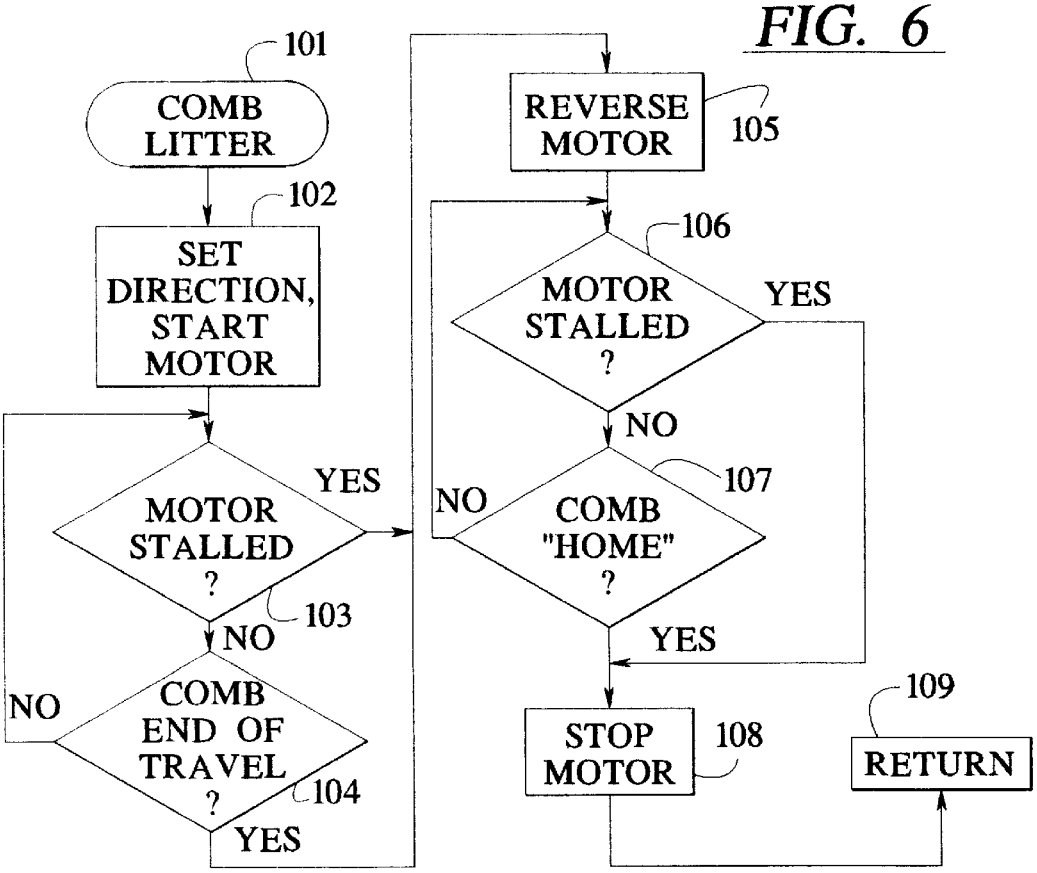
FIG. 6 is a flow chart for operation of the cat litter box of FIGS. 1–5.

FIG. 6 is a flow chart illustrating a subroutine programmed into micro control 96 (FIG. 5) for a self-cleaning operation in the improved litter box 20. The flow chart starts with a comb litter command 101 supplied to the micro control. As a consequence, a set direction and start command is supplied to motor 55 in step 102 of the subroutine. In the next step 103, if motor 55 is stalled, that condition is sensed and there is an output command to subsequent step 105 to reverse the direction of the motor. Ordinarily, however, the motor will not be stalled and the next step is to determine whether the comb is at its end of travel. If not, there is a feedback command to stage 103. If comb 43 is located at the discharge end of its travel, the output from stage 104 of the subroutine illustrated in the flow chart, FIG. 6, is applied to the reverse motor step 105. When the motor has been reversed, the condition of the motor is again checked to see if it is stalled. If so, there is an output signal to a subsequent stop mode step 108. Ordinarily, however, the motor will not be stalled and the next stage 107 of the flow chart receives an enabling signal to check and see whether the comb is in its "home" position. If not, a feedback signal is supplied to stage 106. When comb 43 reaches its "home" position, at storage end 29 of litter box 20, there is an output signal from stage 107 to a stop motor stage 108 which in turn supplies an output signal to a return stage 109. This Completes the subroutine of FIG. 6.

Figure 7:
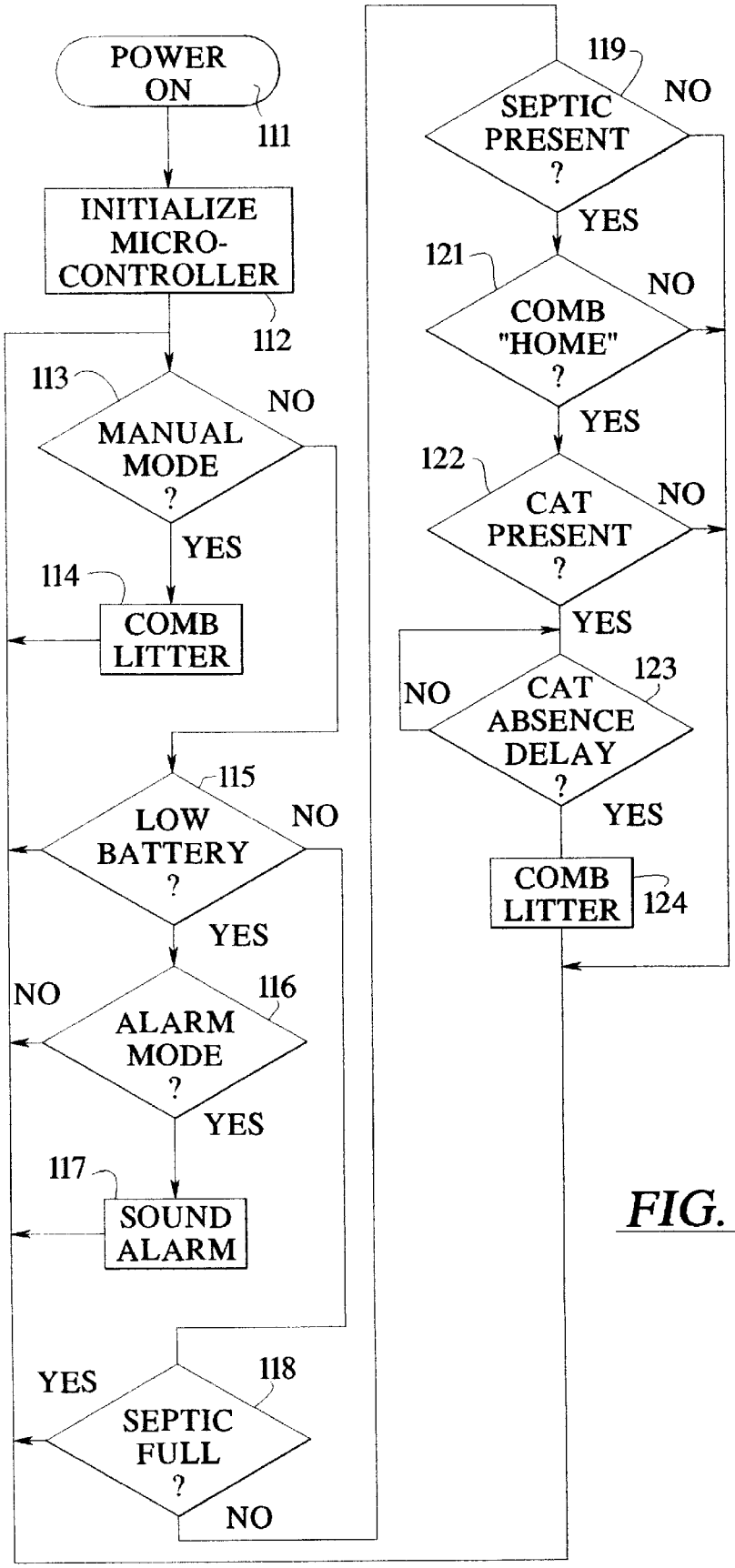
FIG. 7 is a detailed flow chart illustrating optional modes of operation for the controls of the automated self-cleaning cat litter box.

FIG. 7 illustrates a further subroutine that is also programmed into micro processor control 96 (FIG. 5). It starts with a power-on stage 111 that may be initiated by an appropriate switch (not shown) or may start simply with insertion of appropriate batteries into battery case 55 (FIGS. 1–3). The next stage 112 in this subroutine is initialization of the micro controller operation. In the next subroutine stage 113, the micro controller checks to determine whether the mode select switch 91 of FIG. 5 is set for manual mode. If it is, a comb litter procedure is initiated in step 114 and there is a feedback output back to subroutine stage 113. So long as the manual mode is maintained, self-cleaning of the litter box is continued on a cyclical basis. This may be desirable when the person using litter box 20 wants to make sure that all clumps have been removed from the litter in the box so that the liter can be replaced.

If the program is not set for manual mode, a NO output from stage 113 goes to he next stage 115 in the subroutine of FIG. 7 to check the condition of the batteries. If a low battery voltage condition is ascertained, there is an output to the next stage 116 which in turn may actuate a sound alarm stage 117 to produce a programmed output from buzzer 97 (FIG. 5) that alerts the use of litter box 20 that a change of batteries is required. Outputs from stages 116 and 117 may be fed back to stage 113 in this subroutine in appropriate circumstances. Ordinarily, however, when the voltages of the batteries are adequate, there is a NO output from stage 115 and it iS supplied to a stage 118 that determines whether the Septic or waste receptacle 68 (FIGS. 1–3) is full. Ordinarily, the receptacle will not be full but if it is, there is again a feedback signal supplied back to stage 113.

In normal circumstances, with adequate room in the septic receptacle, there is a NO output from stage 118 that is applied to a subsequent stage 119 in the subroutine of FIG. 7. The normal YES output from stage 119 goes to a subsequent stage 121 for the micro control to determine whether the comb of the self-cleaning litter box is at its home position as shown in FIG. 1. The YES output of stage 121 is applied to a subsequent subroutine stage 122 that determines whether a cat is present in the litter box. If a cat is present, there iS a YES output from stage 122 to a delay stage 123 in the program for this subroutine. When the cat leaves the litter box, a YES output from stage 123, after the appropriate delay of several minutes, is supplied to a comb litter stage 124 that is the last stage in this subroutine. The comb litter stage 124 is the source of the comb litter command 101 of FIG. 6. As shown in the flow chart of FIG. 7, NO outputs from either of the stages 121 and 122 result in a feedback signal to stage 113. The output from comb litter stage 124 at the end of the subroutine is also a feedback signal to stage 113.

The automated self,cleaning litter box 20 does not frighten or disturb a cat; the self-cleaning movement of comb 43 does not occur until there is a reasonable certainty that a cat using the litter box has been gone for two to seven minutes, depending on the delay set into the control after exit of a cat is determined before motor 55 is energized. Other sensors can be used instead of photo detectors 82 and 94. For example, infra,red sensors receiving radiation from an appropriate I-R source, or a strain gauge on pan bottom 26, will serve the same purpose as the photo detectors of FIGS. 1–4.

The gear drive connecting motor 55 to shaft 41 is not subject to fouling by the litter, which often includes powdery material that is likely to interfere with operation of other drive mechanisms such as a worm drive. Motor 55 should be sealed against dust and dirt, since it must operate in a rather adverse environment. Litter box 20 is simple and economical in construction, but should afford an extended operating life with little or no attention apart from periodic replacement of the litter and replacement of the batteries 56.

Figure 8:
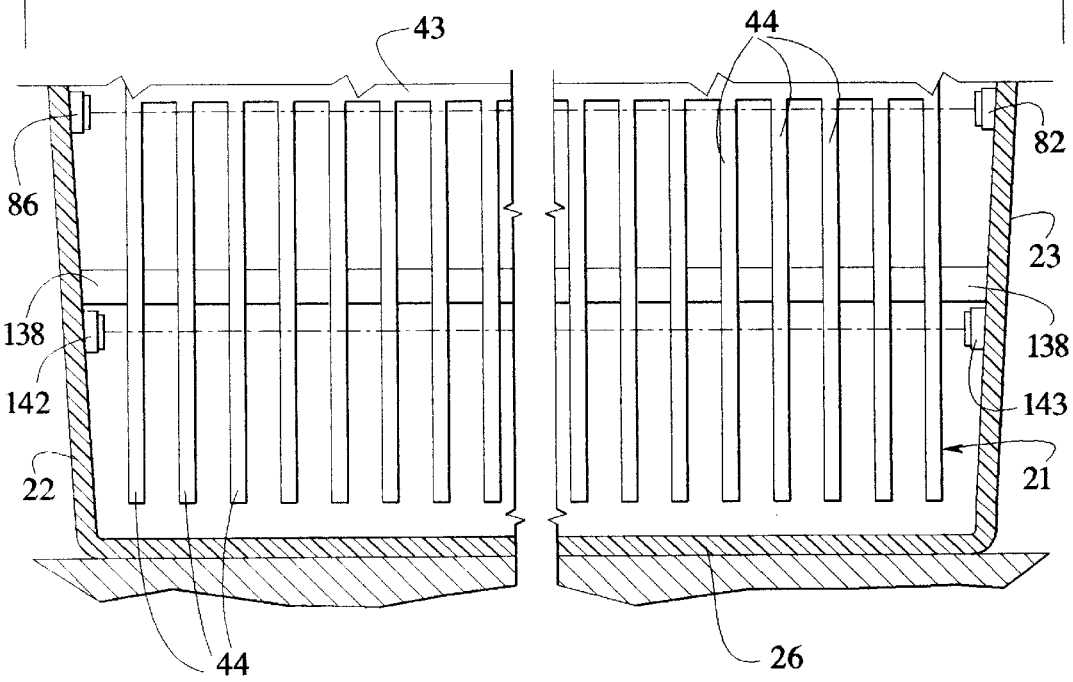
FIG. 8 is a detail view illustrating a litter level sensor.

The detail sectional view of FIG. 8, which is similar to FIG. 4, illustrates a sensor for determining whether there is an adequate supply of litter in the litter box. FIG. 8 again affords a sectional view of housing 21, including side walls 22 and 23 and bottom 26, Also shown are cat detector components comprising light source 86 and photo detector 82, both located well above an internal ridge 138 in the housing that indicates the desired upper level for the litter. Ridge 138 may be continuous around all sides of the litter box, or it may be interrupted if desired. Comb 43 and its tines 44 also appear in FIG. 8.

The variation shown in FIG. 8 also includes a sensor for determining whether there is an adequate supply of litter in the litter box. The litter level sensor comprises a radiation source 142 mounted on the inside of housing wall 22 in alignment with a detector 143 that is mounted on wall 23. Devices 142 and 143i are selected to work together; if the radiation from source 142 is in the visual range, detector 143 is a photo sensor. If an infra red source is used, an infra red detector becomes necessary. Devices 142 and 143 are located immediately below the level indicator 138. If radiation from source 142 reaches detector 143, the level of litter in housing 21 is insufficient and should be supplemented. The litter level sensor 142, 143 is used to actuate an appropriate alarm 97, FIG. 5.

Figure 9:
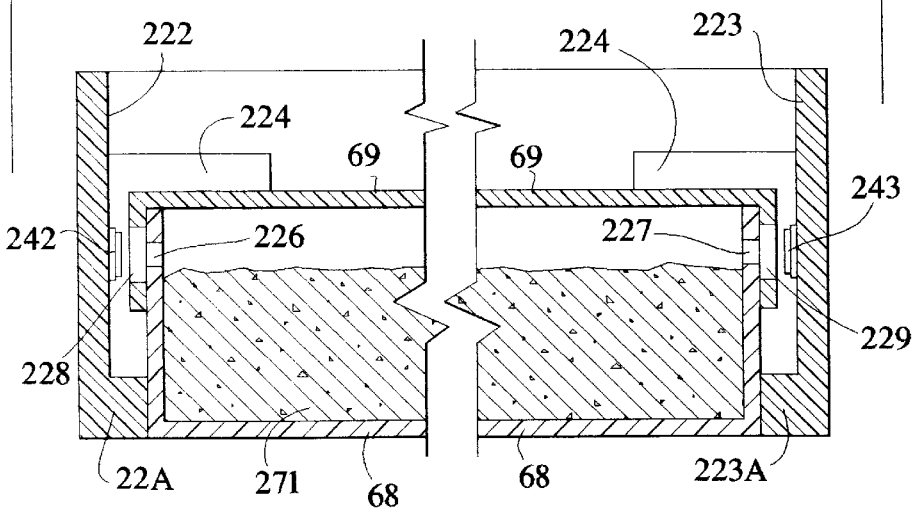
FIG. 9 is a detail view showing a full-receptacle sensor system.

In the detail section view of FIG. 9, the waste receptacle 68 and its lid 69 are shown in closed condition. There is a mass 271 of Waste in receptacle 68, but the receptacle is not yet full. Receptacle 68 is positioned in the litter box by engagement with bosses 222A and 223A on the bottoms of two litter box wall extensions 222 and 223 which may be affixed to litter box housing walls 22 and 23, respectively; see FIGS. 1–3. The position of receptacle 68 may also be determined by engagement with two lateral extensions 224 of walls 222 and 223.

In the arrangement shown in FIG. 9, the walls of waste receptacle 68 and cover 69 adjacent extension/positioning wall 222 are provided with aligned openings 226 and 228, respectively. At the other side of the waste receptacle, adjacent positioning wall 223, the waste receptacle and its cover have similar aligned openings 227 and 229, respectively. Moreover, holes 226 and 228 are aligned with apertures 227 and 229 so that radiation from a source 242 on wall 222 impinges upon a detector 243 on wall 223 as long as the level of waste 271 in receptacle 68 does not block the radiation.

When receptacle 68 is full, the waste in the receptacle cuts off the radiation, so that there is no longer an output from detector 243. Consequently, the sensor system 242, 243 of FIG. 9 is able to actuate an alarm 97 (FIG. 5) to signal to the user that waste receptacle 68 is full and should be replace.

I claim:

1. In an improved self-cleaning cat litter box including:

a pan-shaped housing having a bottom and two spaced side walls connecting a storage end wall to a discharge end wall, the housing defining an upwardly open litter chamber to be filled to a given fill level with cat litter;

a comb path extending from the storage end wall to the discharge end wall;

a comb extending between the side walls; and a comb drive for driving the comb along the comb path from a storage position adjacent the storage end wall to a discharge position adjacent the discharge end wall and back to the storage position, the comb projecting down into the litter chamber to a level below the fill level and near the housing bottom while the comb moves toward the discharge end wall so that the comb engages any clumps in the litter and carries such clumps to the discharge position;

the improvement comprising:

a cat exit sensor for sensing exit of a cat from the litter chamber;

delay means, connected to the cat exit sensor and to the comb drive, for actuating the comb drive to drive the comb from the storage position to the discharge position and back to the storage position at a predetermined time subsequent to sensing of exit of a cat from the litter chamber and a litter level sensor for sensing an insufficient quantity of litter in the litter chamber, below the given fill level.

2. An improved cat litter box according to claim 1, and further comprising:

a waste receptacle located outside of the litter chamber adjacent to the discharge end wall; and deflection means, on the comb path, for deflecting the comb to deposit clumps carried by the comb into the waste receptacle.

3. An improved cat litter box according to claim 2 in which:

the waste receptacle includes a base pan and a cover hinged to the base pan; and the deflection means raises the cover of the waste receptacle to enable deposit of clumps in the base pan, of the waste receptacle.

4. An improved cat litter box according to claim 2 in which the waste receptacle comprises:

a base pan for receiving and storing cat waste from the litter box;

a cover hinged to and normally covering the base pan; and guide means, on the cover, engageable by the deflection means of the litter box to raise the cover to an open position.

5. An improved cat litter box according to claim 1 in which the cat exit sensor comprises:

radiation source, mounted adjacent one side of the litter chamber, the radiation source producing a beam that projects across the litter chamber above the fill level; and a detector mounted adjacent the other side of the litter chamber in position to intercept the beam from the radiation source.

6. An improved cat litter box according to claim 5 in which:

the radiation source is a light source and the beam is a light beam;

the detector is a photodetector; and the light source and the photodetector are mounted on opposite side walls of the litter chamber.

7. An improved cat litter box according to claim 1 in which the litter level sensor comprises:

a radiation source, mounted adjacent one side of the litter chamber, the radiation source producing a beam that projects across the liter chamber below the fill level; and a detector mounted adjacent the other side of the litter chamber in position to intercept the beam from the radiation source.

8. In an improved self-cleaning cat litter box including:

a pan-shaped housing having a bottom and two spaced side walls connecting a storage end wall to a discharge end wall, the housing defining an upwardly open litter chamber to be filled to a given fill level with cat litter;

a comb path extending from the storage end wall to the discharge end wall;

a comb extending between the side walls; and a comb drive for driving the comb along the comb path from a storage position adjacent the storage end wall to a discharge position adjacent the discharge end wall and back to the storage position, the comb projecting down into the litter chamber to a level below the fill level and near the housing bottom while the comb moves toward the discharge end wall so that the comb engages any clumps in the litter and carries such clumps to the discharge position;

the improved construction comprising:

a track member, defining the comb path, mounted to one side wall above the fill level;

a carriage supporting the comb;

a guide wheel mounted on the carriage and engaging the track member;

and a reversible drive motor, comprising a part of the comb drive, mounted on the carriage.

9. An improved cat litter box according to claim 8, in which the carriage includes a comb shaft extending across the litter chamber from one side wall to the other, and further comprising:

a second track member mounted on the other side wall above the fill level; and a second guide wheel mounted on the carriage and engaging the second track member.

10. An improved cat litter box-according to claim 9 in which:

each track member has a multiplicity of equally spaced perforations along the track;

and further comprising:

a first drive wheel mounted on one end of the comb shaft and having a plurality of radial drive pins engageable in the perforations of the first track member; and a second drive wheel mounted on the other end of the comb shaft and having a plurality of radial drive pins engageable in the perforations of the second track member.

11. An improved cat litter box according to claim 10 in which the drive means comprises a gear train connecting the motor to the comb shaft to rotate the comb shaft.

12. An improved cat litter box according to claim 11 in which each track member includes an upwardly inclined extension at its opposite ends so that the comb is directed upwardly above the fill level at both ends of the litter chamber.

13. An improved cat litter box according to claim 8 and further comprising:

a cat exit sensor for sensing exit of a cat from the litter chamber; and delay means, connected to the sensor and to the reversible motor, for actuating the comb drive motor to drive the comb from the storage position to the discharge position at a predetermined time interval subsequent to sensing of exit of a cat from the litter chamber.

14. An improved cat litter box according to claim 13, and further comprising:

a waste receptacle located outside of the litter chamber adjacent to the discharge end wall; and deflection means, on the comb path, for deflecting the comb to deposit clumps carried by the comb into the waste receptacle.

15. An improved cat litter box according to claim 14 in which:

the waste receptacle includes a base pan and a cover hinged to the base pan; and the deflection means raises the cover of the waste receptacle to enable deposit of clumps in the base pan of the waste receptacle.

16. An improved cat litter box according to claim 13 in which the cat exit sensor comprises:

a radiation source, mounted adjacent one side of the litter chamber, the radiation source producing a beam that projects across the litter chamber above the fill level; and a detector mounted adjacent the other side of the litter chamber in position to intercept the beam from the radiation source.

17. An improved cat litter box according to claim 16 in which:

the radiation source is a light source and the beam is a light beam;

the detector is a photodetector; and the light source and the photodetector are mounted on opposite side walls of the litter chamber.

18. An improved cat litter box according to claim 8 and further comprising:

a litter level sensor for sensing an insufficient quantity of litter in the litter chamber, below the given fill level.

19. An improved cat litter box according to claim 18 in which the litter level sensor comprises:

a radiation source mounted adjacent one side of the litter chamber, the radiation source producing a beam that projects across the latter chamber below the fill level; and a detector mounted adjacent the other side of the litter chamber in position to intercept the beam from the radiation source.

20. In an improved self-cleaning cat litter box including:

a pan-shaped housing having a bottom and two spaced side walls connecting a storage end wall to a discharge end wall, the housing defining an upwardly open litter chamber to be filled to a given fill level with cat litter;

a comb path extending from the storage end wall to the discharge end wall;

a comb extending between the side walls;

a comb drive for driving the comb along the comb path from a storage position adjacent the storage end wall to a discharge position adjacent the discharge end wall and back to the storage position, the comb projecting down into the litter chamber to a level below the fill level and near the housing bottom while the comb moves toward the discharge end wall so that the comb engages any waste clumps in the litter and carries such waste clumps to the discharge position; and a waste receptacle locate outside of the litter chamber adjacent to the discharge end wall, for receiving waste carried to the discharge end of the litter box by the comb;

the improved construction comprising:

a waste receptacle sensor for sensing filling of the waste receptacle;

an excess waste alarm actuated by the waste receptacle sensor;

a litter level sensor for sensing an insufficient quantity of litter in the litter chamber, below the given fill level; and an insufficient litter alarm actuated by the litter level sensor.

21. An improved cat litter box according to claim 20 in which the waste receptacle sensor comprises:

a radiation source, mounted on an extension of one side wall beyond the discharge end wall, the radiation source producing a beam that projects across the waste receptacle; and a detector, mounted on an extension of the other side wall beyond the discharge end wall, positioned to intercept the beam from the radiation source.

22. An improved cat litter box according to claim 20 in which the litter level sensor comprises:

a radiation source, mounted adjacent one side of the litter chamber, the radiation source producing a beam that projects across the litter chamber below the fill level; and a detector mounted adjacent the other side of the litter chamber in position to intercept the beam from the radiation source.

*23. A self-cleaning cat litter box comprising:*

*a pan-shaped housing having two opposed sidewalls, the housing defining an upwardly open litter chamber to be filled to a given fill level with cat litter;*

*a comb extending between the two opposed sidewalls;*

*comb drive means for driving the comb between a storage position and a discharge position, the comb projecting down into the litter chamber to a level below the fill level while the comb moves toward the discharge position so that the comb engages clumps in the litter and moves such clumps toward the discharge position; and*

*litter supply sensor means for sensing an insufficient supply of litter in the litter chamber.*

*24. A self-cleaning cat litter box comprising:*

*a pan-shaped housing defining an upwardly open litter chamber to be filled to a given fill level with cat litter;*

*moving means disposed in the pan-shaped housing;*

*a carriage supporting the moving means; and*

*drive means for driving the moving means between a storage position and a discharge position, the moving means projecting down into the litter chamber to a level below the fill level while the moving means moves toward the discharge position so that the moving means engages clumps in the litter and moves such clumps toward the discharge position;*

*said drive means including motor means mounted on the carriage for driving the moving means between the storage position and the discharge position.*

*25. The litter box of claim 24 wherein the motor means includes a reversible drive motor.*

*26. A self-cleaning cat litter box comprising:*

*a pan-shaped housing defining an upwardly open litter chamber to be filled to a given fill level with cat litter;*

*a waste receptacle located outside the litter chamber;*

*a comb disposed in the litter chamber;*

*comb drive means for driving the comb between a storage position and a discharge position, the comb projecting down into the litter chamber to a level below the fill level while the comb moves toward the discharge position so that the comb engages clumps in the litter and moves such clumps toward the discharge position; and*

*waste level sensor means for sensing when waste has reached a predetermined level in the receptacle, and wherein said waste level sensor means is arranged to perform a sensing operation internally of said receptacle.*

*27. A self-cleaning cat litter box comprising:*

*a pan-shaped housing defining an upwardly open litter chamber to be filled to a given fill level with cat litter;*

*a comb disposed in the litter chamber;*

*comb drive means for driving the comb between a storage position and a discharge position, the comb projecting down into the litter chamber to a level below the fill level while the comb moves toward the discharge position so that the comb engages clumps in the litter and moves such clumps toward the discharge position; and*

*mode selector means for selecting between at least a manual operation mode for said comb drive means and an automatic operation mode for said comb drive means.*

*28. A self-cleaning cat litter box comprising:*

*a pan-shaped housing having two opposed sidewalls, the housing defining an upwardly open litter chamber to be filled to a given fill level with cat litter;*

*a comb drive coupled to the housing;*

*a comb extending between the two opposed sidewalls and being coupled to the comb drive and movable between a storage position and a discharge position, the comb projecting down into the litter chamber to a level below the fill level so that the comb engages clumps in the litter and carries such clumps to the discharge position; and*

*a litter supply sensor coupled to the housing.*

*29. The litter box of claim 28 wherein the litter supply sensor is disposed to sense an insufficient supply of litter in the litter chamber.*

*30. The litter box of claim 29 wherein the litter supply sensor includes a radiation source mounted in the litter chamber and disposed to produce a beam that projects across the litter chamber and a detector mounted in the litter chamber to intercept the beam from the radiation source.*

*31. A self-cleaning cat litter box comprising:*

*a pan-shaped housing defining an upwardly open litter chamber to be filled to a given fill level with cat litter;*

*a comb drive coupled to the housing;*

*a comb extending between two opposed sidewalls and being coupled to the comb drive and movable between a storage position and a discharge position, the comb projecting down into the litter chamber to a level below the fill level so that the comb engages clumps in the litter and moves such clumps toward the discharge position; and*

*a comb supporting carriage, said comb drive including a drive motor mounted on the carriage.*

*32. The litter box of claim 31 wherein the drive motor is reversible.*

*33. A self-cleaning cat litter box comprising:*

*a pan-shaped housing defining an upwardly open litter chamber to be filled to a given fill level with cat litter;*

*a comb drive coupled to the housing;*

*a comb extending between two opposed sidewalls and being coupled to the comb drive and movable between a storage position and a discharge position, the comb projecting down into the litter chamber to a level below the fill level so that the comb engages clumps in the litter and moves such clumps toward the discharge position; and*

*a mode selector switch operatively connected to said comb drive, the switch being moveable between a manual operation position wherein an operator causes the comb to move toward the discharge position and an automatic operation position wherein the comb moves toward the discharge position automatically upon the occurrence of a predetermined event.*

*34. A self-cleaning cat litter box comprising:*

*a pan-shaped housing defining an upwardly open litter chamber to be filled to a given fill level with cat litter;*

*a waste receptacle located outside the litter chamber;*

*a comb disposed in the litter chamber;*

*comb drive means for driving the comb between a storage position and a discharge position, the comb projecting down into the litter chamber to a level below the fill level while the comb moves toward the discharge position so that the comb engages clumps in the litter and moves such clumps toward the discharge position; and*

*a waste level sensor coupled to the litter chamber, wherein said waste level sensor is arranged to perform a sensing operation internally of said receptacle.*

*35. The litter box of claim 34 further including an alarm coupled to the waste level sensor, the alarm being activated when the waste level sensor determines that waste in the waste receptacle has reached a predetermined height.*

*36. A self-cleaning cat litter box comprising:*

*a pan-shaped housing having two opposed sidewalls, the housing defining an upwardly open litter chamber to be filled to a given fill level with cat litter;*

*a comb extending between the two opposed sidewalls; and*

*comb drive means for driving the comb between a storage position and a discharge position, the comb projecting down into the litter chamber to a level below the fill level while the comb moves toward the discharge position so that the comb engages clumps in the litter and moves such clumps toward the discharge position, the comb being positioned above the fill level in the storage position and the discharge position.*

*37. A self-cleaning cat litter box comprising:*

*a housing defining an upwardly open litter chamber to be filled to a given fill level with cat litter;*

*a comb drive coupled to the housing;*

*a comb extending between the two opposed sidewalls and being coupled to the comb drive and movable between*

*a storage position and a discharge position, the comb projecting down into the litter chamber to a level below the fill level so that the comb engages clumps in the litter and moves such clumps toward the discharge position and being positioned above the fill level in the storage position.*

*38. A self-cleaning cat litter box comprising:*

*a pan-shaped housing defining an upwardly open litter chamber to be filled to a given fill level with cat litter;*

*a waste receptacle located outside the litter chamber;*

*a comb disposed in the litter chamber;*

*comb drive means for driving the comb between a storage position and a discharge position, the comb projecting down into the litter chamber to a level below the fill level while the comb moves toward the discharge position so that the comb engages clumps in the litter and moves such clumps toward the discharge position; and*

*waste level sensor means for sensing when waste has reached a predetermined level in the receptacle; and*

*wherein said waste level sensor means includes a source of radiation.*

*39. The litter box of claim 38 wherein said waste level sensor means further includes a detector for generating a signal in response to radiation from said source.*

*40. The litter box of claim 39 wherein said waste receptacle includes first and second walls, said radiation source being located on said first wall, said detector being located on said second wall, such that waste at said predetermined level blocks radiation transmission between said radiation source and said detector.*

*41. The litter box of claim 27 further comprising a sensor system for determining whether a cat is in the litter chamber.*

*42. The litter box of claim 41 wherein said sensor system includes a source of radiation and a radiation detector.*

*43. A self-cleaning cat litter box comprising:*

*a pan-shaped housing defining an upwardly open litter chamber to be filled to a given fill level with cat litter;*

*a comb drive coupled to the housing;*

*a comb extending between two opposed sidewalls and being coupled to the comb drive and movable between a storage position and a discharge position, the comb projecting down into the litter chamber to a level below the fill level so that the comb engages clumps in the litter and moves such clumps toward the discharge position; and*

*a mode selector switch, the switch being moveable between a manual operation position wherein an operator causes the comb to move toward the discharge position and an automatic operation position wherein the comb moves toward the discharge position automatically upon the occurrence of a predetermined event; and*

*wherein said comb drive is operated on a cyclical basis when said mode selector switch is in said manual operation position.*

*44. A self-cleaning cat litter box comprising:*

*a pan-shaped housing defining an upwardly open litter chamber to be filled to a given fill level with cat litter;*

*a waste receptacle located outside the litter chamber;*

*a comb disposed in the litter chamber;*

*comb drive means for driving the comb between a storage position and a discharge position, the comb projecting down into the litter chamber to a level below the fill level while the comb moves toward the discharge position so that the comb engages clumps in the litter and moves such clumps toward the discharge position; and*

*a waste level sensor coupled to the litter chamber; and*

*wherein said cat litter box further includes an alarm coupled to the waste level sensor, the alarm being activated when the waste level sensor determines that waste in the waste receptacle has reached a predetermined level; and*

*wherein said waste level sensor includes a source of radiation and a radiation detector.*

*45. The litter box of claim 44 wherein said source and said detector are located such that waste at said predetermined level is between said source and said detector.*

*46. A self-cleaning cat litter box comprising:*

*a housing defining a litter chamber to be filled to a fill level with cat litter, said housing having first and second ends, said litter chamber being located between said first and second ends; and*

*a device for engaging clumps in the litter, said device being coupled to the housing, said device being movable between a storage position and a discharge position, said storage position being located at said first end of said housing, said discharge position being located at said second end of said housing, and wherein said device projects into said litter chamber to a level below the fill level so that the device engages clumps in the litter and moves such clumps toward the discharge position, and wherein said device is positioned above the fill level in said storage position.*

*47. The litter box of claim 46 wherein said device includes tines arranged to move through the cat litter in said litter chamber, said tines being located above the fill level when said device is in said storage position.*

*48. The litter box of claim 47 further comprising a track extension for removing said tines from the cat litter as said device moves toward said storage position.*

* * * * *

US00RE36847C1

(12) EX PARTE REEXAMINATION CERTIFICATE (8432nd)

United States Patent
Waters

(10) Number: US RE36,847 C1
(45) Certificate Issued: Aug. 2, 2011

(54) AUTOMATED SELF-CLEANING LITTER BOX FOR CATS

(75) Inventor: Michael A. Waters, Barrington Hills, IL (US)

(73) Assignees: HP Intellectual Corp., Miramar, FL (US); Applica Incorporated, Miramar, FL (US); Applica Consumer Products, Inc., Miramar, FL (US); Salton, Inc., Miramar, FL (US); Sonex International Corporation, Miramar, FL (US)

Reexamination Request:
No. 90/010,389, Jan. 21, 2009

Reexamination Certificate for:

| | |
|---|---|
| Patent No.: | **Re. 36,847** |
| Issued: | **Sep. 5, 2000** |
| Appl. No.: | **08/997,879** |
| Filed: | **Dec. 24, 1997** |

Related U.S. Patent Documents

Reissue of:

| | |
|---|---|
| (64) Patent No.: | **5,477,812** |
| Issued: | **Dec. 26, 1995** |
| Appl. No.: | **08/371,782** |
| Filed: | **Jan. 12, 1995** |

(51) Int. Cl.
*A01K 1/035* (2006.01)

(52) U.S. Cl. ..... 119/163; 119/166

(58) Field of Classification Search ..... None
See application file for complete search history.

(56) References Cited

U.S. PATENT DOCUMENTS

| | | | |
|---|---|---|---|
| 3,734,057 | A | 5/1973 | Lee et al. |
| 3,811,410 | A | 5/1974 | Roberts |
| 4,011,836 | A | 3/1977 | Temel |
| 4,011,837 | A | 3/1977 | Ksioszk |
| 4,096,827 | A | 6/1978 | Cotter |
| 4,098,229 | A | 7/1978 | Haynes et al. |
| 4,117,804 | A | 10/1978 | Moore |

(Continued)

FOREIGN PATENT DOCUMENTS

| | | |
|---|---|---|
| CA | 2069517 | 11/1993 |
| EP | 0 154 540 | 9/1985 |
| EP | 0 297 015 | 12/1998 |

OTHER PUBLICATIONS

"Order of the Executive Committee", *Lucky Litter LLC* v. *Applica Consumer Products, Inc.*, United States District Court for the Northern District of Illinois, Case No. 1:09–cv–03663 (Docket No. 53, May 7, 2010).

(Continued)

*Primary Examiner*—Jeffrey L. Gellner

(57) ABSTRACT

An improved automated self-cleaning litter box for cats, of the kind having a housing defining an upwardly open chamber for storage of a supply of cat litter, accessible to a cat and having path members on opposed side walls defining a comb path from one end of the chamber to the other. A comb, normally stored at the comb storage end of the chamber, is driven forward along the path to the discharge end of the chamber and back to its orginal storage position. As the comb traverses the chamber forwardly it engages any clumps of waste in the litter and carries them to a disposal receptacle at the discharge end of the chamber. The improvement includes a sensor for sensing the presence of a cat in the litter chamber; a photo electric sensor is preferred, but an infra red, weight, or even an audible sensor can be used. A delay device actuates the comb drive a predetermined time interval after the sensor ceases to sense the presence of a cat in the litter chamber. In the improved construction the comb path includes multi-perforate track members on opposite sides of the litter chamber; those tracks are engaged by rotatable drive wheels connected to the comb. The comb drive includes a reversible electric motor, mounted on the same carriage as the comb. A transparent, biodegradable receptacle is used; alarms for a full receptacle and for an insufficient litter supply are provided.

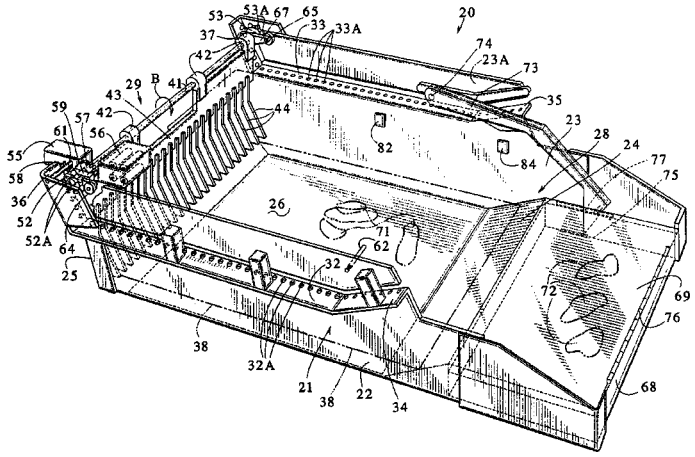

U.S. PATENT DOCUMENTS

| | | | |
|---|---|---|---|
| 4,190,525 | A | 2/1980 | Menzel |
| 4,325,325 | A | 4/1982 | Larter |
| 4,325,822 | A | 4/1982 | Miller |
| 4,574,735 | A | 3/1986 | Hohenstein |
| 4,658,720 | A | 4/1987 | Massonnet |
| 4,729,342 | A | 3/1988 | Loctin |
| 4,844,011 | A | 7/1989 | Strickland |
| 4,846,104 | A | 7/1989 | Pierson, Jr. |
| 4,854,267 | A | 8/1989 | Morrow |
| 4,934,317 | A | 6/1990 | Pourshalchi |
| 4,949,672 | A | 8/1990 | Ratcliff et al. |
| 4,949,673 | A | 8/1990 | Yamamoto |
| 5,048,463 | A | 9/1991 | Wilson et al. |
| 5,048,465 | A | 9/1991 | Carlisi |
| 5,107,797 | A | 4/1992 | LaRoche |
| 5,184,575 | A | 2/1993 | Reinartz |
| 5,188,062 | A | 2/1993 | Joy et al. |
| 5,226,388 | A | 7/1993 | McDaniel |
| 5,249,549 | A | 10/1993 | Rockaitis, III |
| 5,259,340 | A | 11/1993 | Arbogast |
| 5,267,530 | A | 12/1993 | Zamoyski |
| 5,279,258 | A | 1/1994 | Kakuta |
| 5,511,513 | A | 4/1996 | Baron et al. |
| 5,544,620 | A | 8/1996 | Sarkissian |
| 5,564,364 | A | 10/1996 | Kovacs et al. |
| 5,592,900 | A | 1/1997 | Kakuta |

OTHER PUBLICATIONS

"Notification of Docket Entry", *Lucky Litter LLC* v. *Applica Consumer Products, Inc.*, United States District Court for the Northern District of Illinois, Case No. 1:09–cv–03663 (Docket No. 54, May 24, 2010).

"Notification of Docket Entry", *Lucky Litter LLC* v. *Applica Consumer Products, Inc.*, United States District Court for the Northern District of Illinois, Case No. 1:09–cv–03663 (Docket No. 55, Aug. 6, 2010).

"Order", *Applica Consumer Products, Inc. et al.* v. *International Trade Commission et al.*, United States Court of Appeals for the Federal Circuit, Case No. 2009–1292 (Docket No. 106, Jun. 23, 2010).

"Opening Brief For Appellant Lucky Litter LLC", *Lucky Litter LLC et al.* v. *International Trade Commission et al.*, United States Court of Appeals for the Federal Circuit, Case No. 2009–1470, –1474 (Docket No. 16, Jul. 8, 2010).

"Brief For Appellant Ourpet's Company", *Lucky Litter LLC et al.* v. *International Trade Commission et al.*, United States Court of Appeals for the Federal Circuit, Case No. 2009–1470, –1474 (Docket No. 17, Jul. 9, 2010).

"Brief of Intervenors Applica Consumer Products, Inc. and Waters Research Company", *Lucky Litter LLC et al.* v. *International Trade Commission et al.*, United States Court of Appeals for the Federal Circuit, Case No. 2009–1470, –1474 (Docket No. 21, Jul. 30, 2010).

"Brief of Appellee International Trade Commission", *Lucky Litter LLC et al.* v. *International Trade Commission et al.*, United States Court of Appeals for the Federal Circuit, Case No. 2009–1470, –1474 (Docket No. 23, Jul. 30, 2010).

"Reply Brief For Appellant Lucky Litter LLC", *Lucky Litter LLC et al.* v. *International Trade Commission et al.*, United States Court of Appeals for the Federal Circuit, Case No. 2009–1470, –1474 (Docket No. 24, Aug. 13, 2010).

"Reply Brief For Appellant OurPet's Company", *Lucky Litter LLC et al.* v. *International Trade Commission et al.*, United States Court of Appeals for the Federal Circuit, Case No. 2009–1470, –1474 (Docket No. 25, Aug. 13, 2010).

"Report of Respondent OurPet's Company Pursuant to Section V of the order to Cease and Desist", *In re Certain Self–Cleaning Litter Boxes and Components Thereof*, Inv. No. 337–TA–625, Doc . Id. 430149, (ITC Jul. 23, 2009).

"Complaint", *Applica Consumer Products, Inc.* v. *Petco Animal Supplies Stores, Inc. et al.*, United States District Court for the Eastern District of Texas, Case No. 2:09–cv–00222–TJW–CE (Docket No. 1, Jul. 17, 2009).

"Motion for Temporary Restraining Order", *Applica Consumer Products, Inc.* v. *Petco Animal Supplies Stores, Inc. et al.*, United States District Court for the Eastern District of Texas, Case No. 2:09–cv–00222–TJW–CE (Docket Nos. 5 & 6, Jul. 20, 2009).

"Report and Recommendations Re: Motion for Temporary Restraining Order", *Applica Consumer Products, Inc.* v. *Petco Animal Supplies Stores, Inc. et al.*, United States District Court for the Eastern District of Texas, Case No. 2:09–cv–00222–TJW–CE (Docket No. 10, Jul. 22, 2009).

"Answer to Complaint", *Applica Consumer Products, Inc.* v. *Petco Animal Supplies Stores, Inc. et al.*, United States District Court for the Eastern District of Texas, Case No. 2:09–cv–00222–TJW–CE (Docket No. 13, Aug. 3, 2009).

"Motion to Stay", *Applica Consumer Products, Inc.* v. *Petco Animal Supplies Stores, Inc., et al.,* United States District Court for the Eastern District of Texas, Case No. 2:09–cv–00222–TJW–CE (Docket No. 14, Aug. 3, 2009).

"Reply to Response to Motion to Stay", *Applica Consumer Products, Inc.* v. *Petco Animal Supplies Stores, Inc. et al.*, United States District Court for the Eastern District of Texas, Case No. 2:09–cv–00222–TJW–CE (Docket No. 21, Sep. 11, 2009).

"Sur–Reply to Reply to Response to Motion to Stay", *Applica Consumer Products, Inc.* v. *Petco Animal Supplies Stores, Inc. et al.*, United States District Court for the Eastern District of Texas, Case No. 2:09–cv–00222–TJW–CE (Docket No. 24, Sep. 15, 2009).

"Memorandum Order", *Applica Consumer Products, Inc.* v. *Petco Animal Supplies Stores, Inc. et al.*, United States District Court for the Eastern District of Texas, Case No. 2:09–cv–00222–TJW–CE (Docket No. 32, Oct. 23, 2009).

"Complaint", *Applica Consumer Products, Inc.* v. *OurPet's Company*, United States District Court for the Eastern District of Texas, Case No. 2:07–cv–00454–CE (Docket No. 1, Oct. 12, 2007).

"Answer to Complaint and First Counterclaim", *Applica Consumer Products, Inc.* v. *OurPet's Company*, United States District Court for the Eastern District of Texas, Case No. 2:07–cv–00454–CE (Docket No. 13, Jan. 15, 2008).

"Motion to Stay or Enjoin", *Applica Consumer Products, Inc.* v. *OurPet's Company*, United States District Court for the Eastern District of Texas, Case No. 2:07–cv–00454–CE (Docket No. 18, Jan. 29, 2008).

"Notice of Scheduling Conference", *Applica Consumer Products, Inc.* v. *OurPet's Company*, United States District Court for the Eastern District of Texas, Case No. 2:07–cv–00454–CE (Docket No. 26, Feb. 6, 2008).

"Response to Motion to Stay or Enjoin", *Applica Consumer Products, Inc.* v. *OurPet's Company*, United States District Court for the Eastern District of Texas, Case No. 2:07–cv–00454–CE (Docket No. 30, Feb. 13, 2008).

"Reply to Response to Motion to Stay or Enjoin", *Applica Consumer Products, Inc.* v. *OurPet's Company*, United States District Court for the Eastern District of Texas, Case No. 2:07–cv–00454–CE (Docket No. 33, Feb. 25, 2008).

"Notice of Submission of Proposed Standard Protective Order", *Applica Consumer Products, Inc.* v. *OurPet's Company*, United States District Court for the Eastern District of Texas, Case No. 2:07–cv–00454–CE (Docket No. 39, Mar. 4, 2008).

"Sur–replay to Reply to Response to Motion to Stay or Enjoin", *Applica Consumer Products, Inc.* v. *OurPet's Company*, United States District Court for the Eastern District of Texas, Case No. 2:07–cv–00454–CE (Docket No. 40, Mar. 6, 2008).

"Notice of Compliance with Eastern District of Texas Patent Rules 3–3 and 3–4", *Applica Consumer Products, Inc.* v. *OurPet's Company*, United States District Court for the Eastern District of Texas, Case No. 2:07–cv–00454–CE (Docket No. 49, Apr. 11, 2008).

"Notice of Acceptance of Court's Proposed Patent Prosecution Bar for Protective Order", *Applica Consumer Products, Inc.* v. *OurPet's Company*, United States District Court for the Eastern District of Texas, Case No. 2:07–cv–00454–CE (Docket No. 50, Apr. 15, 2008).

"Motion to Disqualify Counsel Baker Botts", *Applica Consumer Products, Inc.* v. *OurPet's Company*, United States District Court for the Eastern District of Texas, Case No. 2:07–cv–00454–CE (Docket No. 51, Apr. 16, 2008).

"Motion to Strike", *Applica Consumer Products, Inc.* v. *OurPet's Company*, United States District Court for the Eastern District of Texas, Case No. 2:07–cv–00454–CE (Docket No. 56, Apr. 24, 2008).

"Response in Opposition to Motion to Strike", *Applica Consumer Products, Inc.* v. *OurPet's Company*, United States District Court for the Eastern District of Texas, Case No. 2:07–cv–00454–CE (Docket No. 58, May 9, 2008).

"Order Denying Motion to Disqualify Counsel", *Applica Consumer Products, Inc.* v. *OurPet's Company*, United States District Court for the Eastern District of Texas, Case No. 2:07–cv–00454–CE (Docket No. 68, Sep. 16, 2008).

"First Amended Docket Control Order", *Applica Consumer Products, Inc.* v. *OurPet's Company*, United States District Court for the Eastern District of Texas, Case No. 2:07–cv–00454–CE (Docket No. 73, Sep. 23, 2008).

"Transcript of Motion Hearing", *Applica Consumer Products, Inc.* v. *OurPet's Company*, United States District Court for the Eastern District of Texas, Case No. 2:07–cv–00454–CE (Docket No. 74, Sep. 29, 2008).

"Joint Motion for Protective Order", *Applica Consumer Products, Inc.* v. *OurPet's Company*, United States District Court for the Eastern District of Texas, Case No. 2:07–cv–00454–CE (Docket No. 81, Dec. 16, 2008).

"Protective Order", *Applica Consumer Products, Inc.* v. *OurPet's Company*, United States District Court for the Eastern District of Texas, Case No. 2:07–cv–00454–CE (Docket No. 85, Dec. 19, 2008).

"Order Granting Extension of Time to File Joint Claim Construction and Prehearing Statement", *Applica Consumer Products, Inc.* v. *OurPet's Company*, United States District Court for the Eastern District of Texas, Case No. 2:07–cv–00454–CE (Docket No. 89, Jan. 7, 2009).

"First Amended Answer, Affirmatie Defenses and Counterclaims", *Applica Consumer Products, Inc.* v. *OurPet's Company*, United States District Court for the Eastern District of Texas, Case No. 2:07–cv–00454–CE (Docket No. 90, Jan. 15, 2009).

"Order Granting Extension of Time to File Joint Claim Construction and Prehearing Statement", *Applica Consumer Products, Inc.* v. *OurPet's Company*, United States District Court for the Eastern District of Texas, Case No. 2:07–cv–00454–CE (Docket No. 93, Jan. 23, 2009).

"Notice of Joint Claim Construction and Prehearing Statement", *Applica Consumer Products, Inc.* v. *OurPet's Company*, United States District Court for the Eastern District of Texas, Case No. 2:07–cv–00454–CE (Docket No. 94, Jan. 26, 2009).

"Answer to Counterclaim and Answer to Complaint", *Applica Consumer Products, Inc.* v. *OurPet's Company*, United States District Court for the Eastern District of Texas, Case No. 2:07–cv–00454–CE (Docket No. 95, Jan. 29, 2009).

"Agreed Motion to Amend/Correct Scheduling Order", *Applica Consumer Products, Inc.* v. *OurPet's Company*, United States District Court for the Eastern District of Texas, Case No. 2:07–cv–00454–CE (Docket No. 99, Feb. 24, 2009).

"Order granting Motion to Amend deadlines", *Applica Consumer Products, Inc.* v. *OurPet's Company*, United States District Court for the Eastern District of Texas, Case No. 2:07–cv–00454–CE (Docket No. 102, Feb. 25, 2009).

"Response in Opposition to Motion to Change Venue", *Applica Consumer Products, Inc.* v. *OurPet's Company*, United States District Court for the Eastern District of Texas, Case No. 2:07–cv–00454–CE (Docket No. 108, Mar. 23, 2009).

"Notice of ITC Decision and Intent of Parties to Appeal", *Applica Consumer Products, Inc.* v. *OurPet's Company*, United States District Court for the Eastern District of Texas, Case No. 2:07–cv–00454–CE (Docket No. 112, Apr. 14, 2009).

"Notice Regarding Stay", *Applica Consumer Products, Inc.* v. *OurPet's Company*, United States District Court for the Eastern District of Texas, Case No. 2:07–cv–00454–CE (Docket No. 117, Apr. 16, 2009).

"Joint Motion to Suspend Deadlines Pending Entry of Amended Docket Control Order", *Applica Consumer Products, Inc.* v. *OurPet's Company*, United States District Court for the Eastern District of Texas, Case No. 2:07–cv–00454–CE (Docket No. 118, Apr. 20, 2009).

"Notice Regarding Intent of Proceed", *Applica Consumer Products, Inc.* v. *OurPet's Company*, United States District Court for the Eastern District of Texas, Case No. 2:07–cv–00454–CE (Docket No. 120, Apr. 24, 2009).

"Notice of Filing of Official Transcript of Motions Hearing", *Applica Consumer Products, Inc.* v. *OurPet's Company*, United States District Court for the Eastern District of Texas, Case No. 2:07–cv–00454–CE (Docket No. 123, May 7, 2009).

"Order Regarding Stay", *Applica Consumer Products, Inc.* v. *OurPet's Company*, United States District Court for the Eastern District of Texas, Case No. 2:07–cv–00454–CE (Docket No. 134, Aug. 28, 2009).

"Complaint", *Lucky Litter LLC* v. *Applica Consumer Products, Inc.*, United States District Court for the Northern District of Illinois, Case No. 1:09–cv–03663 (Docket No. 1, Jun. 17, 2009).

"Response to Motion for Temporary Restraining Order", *Lucky Litter LLC* v. *Applica Consumer Products, Inc.*, United States District Court for the Northern District of Illinois, Case No. 1:09–cv–03663 (Docket No. 16, Jun. 30, 2009).

"First Amended Complaint", *Lucky Litter LLC* v. *Applica Consumer Products, Inc.*, United States District Court for the Northern District of Illinois, Case No. 1:09–cv–03663 (Docket No. 28, Aug. 3, 2009).

"Answer to Amended Complaint and Counterclaim", *Lucky Litter LLC* v. *Applica Consumer Products, Inc.*, United States District Court for the Northern District of Illinois, Case No. 1:09–cv–03663 (Docket No. 37, Sep. 11, 2009).

"Answer to Counterclaim", *Lucky Litter LLC* v. *Applica Consumer Products, Inc.*, United States District Court for the Northern District of Illinois, Case No. 1:09–cv–03663 (Docket No. 41, Oct. 1, 2009).

"Amended Answer to Complaint with Jury Demand and Counterclaim", *Lucky Litter LLC* v. *Applica Consumer Products, Inc.*, United States District Court for the Northern District of Illinois, Case No. 1:09–cv–03663 (Docket No. 44, Oct. 14, 2009).

"Notice", In re *Certain Self–Cleaning Litter Boxes and Components Thereof*, Inv. No. 337–TA–625, Doc. Id. 288899, (ITC Dec. 28, 2007).

"Motion to Amend the Complaint and Notice of Investigation", In re *Certain Self–Cleaning Litter Boxes and Components Thereof*, Inv. No. 337–TA–625, Doc. Id. 290380, (ITC Jan. 22, 2008).

"Order, 4 Setting Target Date and Submission Proposed Procedural Schedules", In re *Certain Self–Cleaning Litter Boxes and Components Thereof*, Inv. No. 337–TA–625, Doc. Id. 290868, (ITC Jan. 29, 2008).

"Joint Proposed Procedural Schedule", In re *Certain Self–Cleaning Litter Boxes and Components Thereof*, Inv. No. 337–TA–625, Doc. ID. 291914, (ITC Feb. 8, 2008).

"Order, 5 Initial Determination Granting Motion to Amend the Complaint and Notice of Investigation", In re *Certain Self–Cleaning Litter Boxes and Components Thereof*, Inv. No. 337–TA–625, Doc . Id. 291982, (ITC Feb. 11, 2008).

"Order, 6 Setting the Procedural Schedule", In re *Certain Self–Cleaning Litter Boxes and Components Thereof*, Inv. No. 337–TA–625, Doc. Id. 291983, (ITC Feb. 11, 2008).

"Joint Report of the Parties' Jan. 2008 Discovery Committee Conferences", In re *Certain Self–Cleaning Litter Boxes and Components Thereof*, Inv. No. 337–TA–625, Doc. Id. 292042, (ITC Feb. 11, 2008).

"Amended Motion to Quash Third Party Subpoenas", In re *Certain Self–Cleaning Litter Boxes and Components Thereof*, Inv. No. 337–TA–625, Doc. Id. 292543, (ITC Feb. 15, 2008).

"Memo In Suport of Motion to Quash PTS", In re *Certain Self–Cleaning Litter Boxes and Components Thereof*, Inv. No. 337–TA–625, Doc. Id. 292748 (ITC Feb. 20, 2008).

"Motion of Non–Parties Nottingham–Spirk, Kalman, O'Toole & Soreo to Quash Subpoenas", In re *Certain Self–Cleaning Litter Boxes and Components Thereof*, Inv. No. 337–TA–625, Doc. Id. 292775, (ITC Feb. 20, 2008).

"Motion of Third Party RDI, Inc. to Quash", In re *Certain Self–Cleaning Litter Boxes and Components Thereof*, Inv. No. 337–TA–625, Doc. Id. 292790, (ITC Feb. 20,2008).

"Notice, Regarding Motions to Quash filed by Certain Third Parties", In re *Certain Self–Cleaning Litter Boxes and Components Thereof*, Inv. No. 337–TA–625, Doc. Id. 292800, (ITC Feb. 20, 2008).

"Notice, Commission Decision Not to Review an ID Granting Complainant's Motion to Amend the Complaint", In re *Certain Self–Cleaning Litter Boxes and Components Thereof*, Inv. No. 337–TA–625, Doc. ID. 294216, (ITC Mar. 7, 2008).

"Agreed Motion to Amend Order No. 6", In re *Certain Self–Cleaning Litter Boxes and Components Thereof*, Inv. No. 337–TA–625, Doc. Id. 298596, (ITC Apr. 25, 2008).

"Expert Witness Designation", In re *Certain Self–Cleaning Litter Boxes and Components Thereof*, Inv. No. 337–TA–625, Doc. Id. 299370, (ITC May 5, 2008).

"Lucky Litter Identification of Expert Witnesses", In re *Certain Self–Cleaning Litter Boxes and Components Thereof*, Inv. No. 337–TA–625, Doc. Id. 299379, (ITC May 5, 2008).

"Lucky Litter Notice of Prior Art", In re *Certain Self–Cleaning Litter Boxes and Components Thereof*, Inv. No. 337–TA–625, Doc. Id. 300144, (ITC May 13, 2008).

"Motion for Leave to File a Reply in Support of the Joint Motion", In re *Certain Self–Cleaning Litter Boxes and Components Thereof*, Inv. No. 337–TA–625, Doc. Id. 300229, (ITC May 13, 2008).

"Respondent OurPet's Company's Notice of Prior Art",In re *Certain Self–Cleaning Litter Boxes and Components Thereof*, Inv. No. 337–TA–625, Doc. Id. 300248, (ITC May 13, 2008).

"Complainants Notice of Art", In re *Certain Self–Cleaning Litter Boxes and Components Thereof*, Inv. No. 337–TA–625, Doc. Id. 300250, (ITC May 13, 2008).

"Staff's Notice of Prior Art", In re *Certain Self–Cleaning Litter Boxes and Components Thereof*, Inv. No. 337–TA–625, Doc. Id. 300146, (ITC May 13, 2008).

"Respondent Dockocil Manufacturing Company Inc.'s Notice of Prior Art and Tentative Witness List", In re *Certain Self–Cleaning Litter Boxes and Components Thereof*, Inv. No. 337–TA–625, Doc. Id. 300266, (ITC May 14, 2008).

"Lucky Litter Amended Notice of Prior Art", In re *Certain Self–Cleaning Litter Boxes and Components Thereof*, Inv. No. 337–TA–625, Doc. Id. 301020, (ITC May 20, 2008).

"Order, 8 Granting Complainants' Motion to Declassify the Identify of Manufacturers of the Products", In re *Certain Self–Cleaning Litter Boxes and Components Thereof*, Inv. No. 337–TA–625, Doc. Id. 301309, (ITC May 23, 2008).

"Letter from Congressman Steven C. LaTourette",In re *Certain Self–Cleaning Litter Boxes and Components Thereof*, Inv. No. 337–TA–625, Doc. Id. 301461, (ITC May 27, 2008).

"Respondent OurPet's Company Response to Complainants's Motion to Compel Production of Documents", In re *Certain Self–Cleaning Litter Boxes and Components Thereof*, Inv. No. 337–TA–625, Doc. Id. 304499, (ITC Jul. 2, 2008).

"Respondent Doskocil Manufacturing Company Inc.'s Response in Opposition to Motion to Compel", In re *Certain Self–Cleaning Litter Boxes and Components Thereof*, Inv. No. 337–TA–625, Doc. Id. 304517, (ITC Jul. 2, 2008).

"Order, 13 Granting–in–Part and Denying–in–Part Complainants's Motion to Compel Production of Documents", In re *Certain Self–Cleaning Litter Boxes and Components Thereof*, Inv. No. 337–TA–625, Doc. Id. 304552, (ITC Jul. 3, 2008).

"Order, 14 Denying Complaint's Motion to Compel Respondent Ourpets to Supplement Response to Complainant's", In re *Certain Self–Cleaning Litter Boxes and Components Thereof*, Inv. No. 337–TA–625, Doc. Id. 304769, (ITC Jul. 8, 2008).
"Order, 20 Denying Complainant's Motion to Compel Doskocil Financial Information", In re *Certain Self–Cleaning Litter Boxes and Components Thereof*, Inv. No. 337–TA–625, Doc. Id. 305081, (ITC Jul. 11, 2008).
"Order, 22 Granting–in–Part & Denying–in–Part Complainant's Motion to Compel Respondent OurPets Company", In re *Certain Self–Cleaning Litter Boxes and Components Thereof*, Inv. No. 337–TA–625, Doc. Id. 305254, (ITC Jul. 15, 2008).
"Complainant's Unopposed Motion for a Brief Extension of Time to Respond to Motion for Summary Determination", In re *Certain Self–Cleaning Litter Boxes and Components Thereof*, Inv. No. 337–TA–625, Doc. Id. 305263, (ITC Jul. 15, 2008).
"Order, 24 Granting Unopposed Motion for Extension of Time", In re *Certain Self–Cleaning Litter Boxes and Components Thereof*, Inv. No. 337–TA–625, Doc. Id. 305277, (ITC Jul. 15, 2007).
"Order, 25 Denying Respondent Lucky Litter LLC's Motion to Comel Complainant Applica", In re *Certain Self–Cleaning Litter Boxes and Components Thereof*, Inv. No. 337–TA–625, Doc. Id. 305327, (ITC Jul. 16, 2008).
"Staff Response to Doskocil Motion for Summary Determination Non–infringement", In re *Certain Self–Cleaning Litter Boxes and Components Thereof*, Inv. No. 337–TA–625, Doc. Id. 305582, (ITC Jul. 18, 2008).
"Staff Response to Complainants Motion for Summary Determination on Anticipation Defense", In re *Certain Self–Cleaning Litter Boxes and Components Thereof*, Inv. No. 337–TA–625, Doc. Id. 305583, (ITC Jul. 18, 2008).
"Staff Response to OurPets Motion for Summary Determination Claim 33", In re *Certain Self–Cleaning Litter Boxes and Components Thereof*, Inv. No. 337–TA–625, Doc. Id. 305584, (ITC Jul. 18, 2008).
"Staff Response to OurPets Motion for Summary Determination Claims 27 and 41", In re *Certain Self–Cleaning Litter Boxes and Components Thereof*, Inv. No. 337–TA–625, Doc. Id. 305585, (ITC Jul. 18, 2008).
"Order, 27 Denying Ourpet's Company's Motion for Summary Determination of Invalidity of Claims 27 and 33", In re *Certain Self–Cleaning Litter Boxes and Components Thereof*, Inv. No. 337–TA–625, Doc. Id. 305626, (ITC Jul. 21, 2008).
"Order, 29 Denying Joint Motion for All Private Parties for Reconsideration of Order No. 16", In re *Certain Self–Cleaning Litter Boxes and Components Thereof*, Inv. No. 337–TA–625, Doc. Id. 305635, (ITC Jul. 21, 2008).
"Motion, 60 Motion of Respondent Lucky Litter LLC", In re *Certain Self–Cleaning Litter Boxes and Components Thereof*, Inv. No. 337–TA–625, Doc. Id. 305654, (ITC Jul. 21, 2008).
"Doskocil Manufacturing Co.'s Statement Regarding Use of Witness Statements & Offering of Expert Rpt", In re *Certain Self–Cleaning Litter Boxes and Components Thereof*, Inv. No. 337–TA–625, Doc. Id. 305655, (ITC Jul. 21, 2008).
"Staff Response to Motion to Reconsider Order No. 16", In re *Certain Self–Cleaning Litter Boxes and Components Thereof*, Inv. No. 337–TA–625, Doc. Id. 305637, (ITC Jul. 21, 2008).
"Complainants' Statement re: Witness Statements", In re *Certain Self–Cleaning Litter Boxes and Components Thereof*, Inv. No. 337–TA–625, Doc. Id. 305672, (ITC Jul. 21, 2008).
"OurPet's Statement re Use of Witness Statements and Submission of Expert Reports", In re *Certain Self–Cleaning Litter Boxes and Components Thereof*, Inv. No. 337–TA–625, Doc. Id. 305676, (ITC Jul. 22, 2008).
"Complainant Waters Research Company's Statement Regarding Witness Statements", In re *Certain Self–Cleaning Litter Boxes and Components Thereof*, Inv. No. 337–TA–625, Doc. Id. 305678, (ITC Jul. 22, 2008).
"Order, 32 Denying Lucky Litter LLC's Motion for Reconsideration of Order No. 25", In re *Certain Self–Cleaning Litter Boxes and Components Thereof*, Inv. No. 337–TA–625, Doc. Id. 305838, (ITC Jul. 24, 2008).
"Order, 21 Granting Complainant's Motion to Compel Production of Documents and Testimony Relating to Microcontroller Schematics and Source Code", In re *Certain Self–Cleaning Litter Boxes and Components Thereof*, Inv. No. 337–TA–625, Doc. Id. 306101, (ITC Jul. 28, 2008).
"Lucky Litter Second Amended Notice of Prior Art", In re *Certain Self–Cleaning Litter Boxes and Components Thereof*, Inv. No. 337–TA–625, Doc. Id. 306245, (ITC Jul. 29, 2008).
"Order, 34 Clarifying Order No. 28", In re *Certain Self–Cleaning Litter Boxes and Components Thereof*, Inv. No. 337–TA–625, Doc. Id. 306936, (ITC Aug. 7, 2008).
"Notice, Commission Decision Not to Review an ID Granting a Motion for Summary Determination", In re *Certain Self–Cleaning Litter Boxes and Components Thereof*, Inv. No. 337–TA–625, Doc. Id. 307128, (ITC Aug. 8, 2008).
"Order, 36 Denying OurPet's Company's and Lucky Litter LLC's Motion for Summary Determination", In re *Certain Self–Cleaning Litter Boxes and Components Thereof*, Inv. No. 337–TA–625, Doc. Id. 307159, (ITC Aug. 11, 2008).
"Order, 38 Denying OurPet's Company's Motion for Summary Determination that Claims 8, 13, 24, 25, 31, and 32", In re *Certain Self–Cleaning Litter Boxes and Components Thereof*, Inv. No. 337–TA–625, Doc. Id. 307160, (ITC Aug. 11, 2008).
"Order, 39 Denying Lucky Litter LLC's & OurPet's Company's Motion for Summary Determination", In re *Certain Self–Cleaning Litter Boxes and Components Thereof*, Inv. No. 337–TA–625, Doc. Id. 307161, (ITC Aug. 11, 2008).
"Order, 17 Denying Complainant's Motion to Enforce Subpoena and to Compel Production of Documents", In re *Certain Self–Cleaning Litter Boxes and Components Thereof*, Inv. No. 337–TA–625, Doc. Id. 307163, (ITC Aug. 11, 2008).
"Order, 30 Initial Determination Finding That Complainant Has Satisfied the Importation Requirement", In re *Certain Self–Cleaning Litter Boxes and Components Thereof*, Inv. No. 337–TA–625, Doc. Id. 307169, (ITC Aug. 11, 2008).
"Order, 33 Denying Respondents' Motion for Summary Determination of Invalidity for Failure to Comply", In re *Certain Self–Cleaning Litter Boxes and Components Thereof*, Inv. No. 337–TA–625, Doc. Id. 307171, (ITC Aug. 11, 2008).
"Order, 40 Regarding the Parties' Requests for Receipt of Evidence Without a Sponsoring Witness", In re *Certain Self–Cleaning Litter Boxes and Components Thereof*, Inv. No. 337–TA–625, Doc. Id. 307176, (ITC Aug. 11, 2008).

"Order, 23 Denying Motion to Quash Subpoena Duces Tecum and Ad Testificandum of Third Parties Jason Kocher", In re *Certain Self–Cleaning Litter Boxes and Components Therefore*, Inv. No. 337–TA–625, Doc. Id. 307166, (ITC Aug. 11, 2008).

"Order, 26 Denying Lucky Litter LLC's Motion for Summary Determination of Non–Infringement", In re *Certain Self–Cleaning Litter Boxes and Components Thereof*, Inv. No. 337–TA–625, Doc. Id. 307167, (ITC Aug. 11, 2008).

"Order, 31 Denying Doskocil Manufacturing Company Inc.'s Motion for Summary Determination of Non–Infringement",In re *Certain Self–Cleaning Litter Boxes and Components Thereof*, Inv. No. 337–TA–625, Doc. Id. 307170, (ITC Aug. 11, 2008).

"Complainants' Objections to Testimony of Dr James Rice, J Cagan, A Cook & Dr Tsengas", In re *Certain Self–Cleaning Litter Boxes and Components Thereof*, Inv. No. 337–TA–625, Doc. Id. 307260, (ITC Aug. 12, 2008).

"Complainants' Objections to Respondent's List of Exhibits", In re *Certain Self–Cleaning Litter Boxes and Components Thereof*, Inv. No. 337–TA–625, Doc. Id. 307264, (ITC Aug. 12, 2008).

"Complainants' Objections & Counter Designations to Respondents' Deposition Designations", In re *Certain Self–Cleaning Litter Boxes and Components Thereof*, Inv. No. 337–TA–625, Doc. Id. 307274, (ITC Aug. 12, 2008).

"Staff Objections to Direct Exhibits, filed by Kevin Baer", In re *Certain Self–Cleaning Litter Boxes and Components Thereof*, Inv. No. 337–TA–625, Doc. Id. 307296, (ITC Aug. 12, 2008).

"Complainants' MFL to Supplement Their Documentary Exhibit List", In re *Certain Self–Cleaning Litter Boxes and Components Thereof*, Inv. No. 337–TA–625, Doc. Id. 307391, (ITC Aug. 13, 2008).

"Complainants' Letter re Ground Rule 3.2 Certification", In re *Certain Self–Cleaning Litter Boxes and Components Thereof*, Inv. No. 337–TA–625, Doc. Id. 307432, (ITC Aug. 14, 2008).

"Respondents Motion for Leave to Supplement", In re *Certain Self–Cleaning Litter Boxes and Components Thereof*, Inv. No. 337–TA–625, Doc. Id. 307516, (ITC Aug. 14, 2008).

"Complainants' Response to Respondents LL's Objection to the Designation of Deposition Testimony of Kristin Grube", In re *Certain Self–Cleaning Litter Boxes and Components Thereof*, Inv. No. 337–TA–625, Doc. Id. 307611, (ITC Aug. 15, 2008).

"Response to Respondents' Objections to Greason Deposition Designation", In re *Certain Self–Cleaning Litter Boxes and Components Thereof*, Inv. No. 337–TA–625, Doc. Id. 307625, (ITC Aug. 15, 2008).

"Complainants' Response to Respondents' Objection to the Direct Witness Stmt of Dr. Kristin Wood", In re *Certain Self–Cleaning Litter Boxes and Components Thereof*, Inv. No. 337–TA–625, Doc. Id. 307647, (ITC Aug. 15, 2008).

"Complainants' Rsponse to Respondent LL's Objection to the Designation of Depo Testimony of Nathan Ulrich", In re *Certain Self–Cleaning Litter Boxes and Components Thereof*, Inv. No. 337–TA–625, Doc. Id. 307648, (ITC Aug. 15, 2008).

"Complainants' Rsponse to Respondents' and the Commission's Investigative Staff's Objection to the Direct Witness Stmt of Michael Waters", In re *Certain Self–Cleaning Litter Boxes and Components Thereof*, Inv. No. 337–TA–625, Doc. Id. 307649, ITC (Aug. 15, 2008).

"Order, 45 Regarding the Parties' Motions to Supplement Their Exhibit Lists", In re *Certain Self–Cleaning Litter Boxes and Components Thereof*, Inv. No. 337–TA–625, Doc. Id. 307705, (ITC Aug. 18, 2008).

"Respondents' Objections to Wood Rebuttal", In re *Certain Self–Cleaning Litter Boxes and Components Thereof*, Inv. No. 337–TA–625, Doc. Id. 307883, (ITC Aug. 18, 2008).

"Complainants' Objections to Respondents' List of Reuttal Exhibits", In re *Certain Self–Cleaning Litter Boxes and Components Thereof*, Inv. No. 337–TA–625, Doc. Id. 307778, (ITC Aug. 18, 2008).

"Deposition Testimony of Alan Cook", In re *Certain Self–Cleaning Litter Boxes and Components Thereof*, Inv. No. 337–TA–625, Doc. Id. 307793, (ITC Aug. 18, 2008).

"Deposition Testimony of Nathan Ulrich", In re *Certain Self–Cleaning Litter Boxes and Components Thereof*, Inv. No. 337–TA–625, Doc. Id. 307795, (ITC Aug. 18, 2008).

"Deposition Testimony of Kristin Grube", In re *Certain Self–Cleaning Litter Boxes and Components Thereof*, Inv. No. 337–TA–625, Doc. Id. 307797, (ITC Aug. 18, 2008).

"Deposition Testimony of Greason", In re *Certain Self–Cleaning Litter Boxes and Components Thereof*, Inv. 337–TA–625, Doc. Id. 307798, (ITC Aug. 18, 2008).

"Deposition Testimony of Silberblatt", In re *Certain Self–Cleaning Litter Boxes and Components Thereof*, Inv. No. 337–TA–625, Doc. Id. 307801, (ITC Aug. 18, 2008).

"Deposition Testimony of Devlin", In re *Certain Self–Cleaning Litter Boxes and Components Thereof*, Inv. No. 337–TA–625, Doc. Id. 307804, (ITC Aug. 18, 2008).

"Complainants' Objections to Rebuttal Witness Statements of Cook, Rice, Grube, O'Toole & Tsengas", In re *Certain Self–Cleaning Litter Boxes and Components Thereof*, Inv. No. 337–TA–625, Doc. Id. 307808, (ITC Aug. 18, 2008).

"Objections to Rebuttal Witness Statement of Angelo Carlisi", In re *Certain Self–Cleaning Litter Boxes and Components Thereof*, Inv. No. 337–TA–625, Doc. Id. 307877, (ITC Aug. 18, 2008).

"Respondents Objections to Rebuttal Exhibit List", In re *Certain Self–Cleaning Litter Boxes and Components Thereof*, Inv. No. 337–TA–625, Doc. Id. 307887, (ITC Aug. 18, 2008).

"Staff Objections to Rebuttal Exhibits", In re *Certain Self–Cleaning Litter Boxes and Components Thereof*, Inv. No. 337–TA–625, Doc. Id. 307904, (ITC Aug. 19, 2008).

"Notice, Commission Decision Not to Review an ID Granting–in–Part a Motion for Partial Summary Determination", In re *Certain Self–Cleaning Litter Boxes and Components Thereof*, Inv. No. 337–TA–625, Doc. Id. 307920, (ITC Aug. 19, 2008).

"Complainants' Opposition to Respondents Motion for Leave to Supp Direct Exhibit List", In re *Certain Self–Cleaning Litter Boxes and Components Thereof*, Inv. No. 337–TA–625, Doc. Id. 307978, (ITC Aug. 19, 2008).

"Respondents OurPet's Company's and Lucky Litter's High Priority Objection Statement", In re *Certain Self–Cleaning Litter Boxes and Components Thereof*, Inv. No. 337–TA–625, Doc. Id. 308031, (ITC Aug. 19, 2008).

"Motion for Reconsideration of Order No. 43", In re *Certain Self–Cleaning Litter Boxes and Components Thereof*, Inv. No. 337–TA–625, Doc. Id. 308038, (ITC Aug. 19, 2008).

"Response to Order No. 44 re: Complainants' Motion to Designate Sabin Testimony", In re *Certain Self–Cleaning Litter Boxes and Components Thereof*, Inv. No. 337–TA–625, Doc. Id. 308045, (ITC Aug. 19, 2008).

"Complainants' Objections to the Rebuttal Testimony of Cagan", In re *Certain Self–Cleaning Litter Boxes and Components Thereof*, Inv. No. 337–TA–625, Doc. Id. 307950, (ITC Aug. 19, 2008).

"Order, 46 Granting the Parties' Motions to Supplement Their Exhibit Lists", In re *Certain Self–Cleaning Litter Boxes and Components Thereof*, Inv. No. 337–TA–625, Doc. Id. 308101, (ITC Aug. 20, 2008).

"Staff Joint Response to Motions in Limine", In re *Certain Self–Cleaning Litter Boxes and Components Thereof*, Inv. No. 337–TA–625, Doc. Id. 308224, (ITC Aug. 20, 2008).

"Declaration of Waters Justifying Confidentiality of Exhibits", In re *Certain Self–Cleaning Litter Boxes and Components Thereof*, Inv. No. 337–TA–625, Doc. Id. 308252, (ITC Aug. 21, 2008).

"Lucky Litter's Updated Exhibit List", In re *Certain Self–Cleaning Litter Boxes and Components Thereof*, Inv. No. 337–TA–625, Doc. Id. 308303, (ITC Aug. 21, 2008).

"Respondents' Response to Objections to Rebuttal Witness Statements", In re *Certain Self–Cleaning Litter Boxes and Components Thereof*, Inv. No. 337–TA–625, Doc. Id. 308305, (ITC Aug. 21, 2008).

"Response to Objections to Rebuttal Exhibit List", In re *Certain Self–Cleaning Litter Boxes and Components Thereof*, Inv. No. 337–TA–625, Doc. Id. 308307, (ITC Aug. 21, 2008).

"Lucky Litter Confidentiality Declaration", In re *Certain Self–Cleaning Litter Boxes and Components Thereof*, Inv. No. 337–TA–625, Doc. Id. 308308, (ITC Aug. 21, 2008).

"Complainants' Response to Staff's High Priority Objections," In re *Certain Self–Cleaning Litter Boxes and Components Thereof*, Inv. No. 337–TA–625, Doc. Id. 308270, (ITC Aug. 21, 2008).

"Complainants' Responses to Respondents Ourpets and Lucky Litter's Objections to Complainants' Rebuttal", In re *Certain Self–Cleaning Litter Boxes and Components Thereof*, Inv. No. 337–TA–625, Doc. Id. 308293, (ITC Aug. 21, 2008).

"Responses to Objections to Cagan Rebuttal", In re *Certain Self–Cleaning Litter Boxes and Components Thereof*, Inv. No. 337–TA–625, Doc. Id. 308304, (ITC Aug. 21, 2008).

"Staff Response to Motion to Terminate", In re *Certain Self–Cleaning Litter Boxes and Components Thereof*, Inv. No. 337–TA–625, Doc. id. 308321, (ITC Aug. 21, 2008).

"Objections and Counter Designations to P. Sabin Deposition", In re *Certain Self–Cleaning Litter Boxes and Components Thereof*, Inv. No. 337–TA–625, Doc. Id. 308375, (ITC Aug. 22, 2008).

"Consent Stipulation", In re *Certain Self–Cleaning Litter Boxes and Components Thereof*, Inv. No. 337–TA–625, Doc. Id. 308378, (ITC Aug. 22, 2008).

"Complainants' Supplemental Response to Staffs High Priority Objections & Joint Response to Motions", In re *Certain Self–Cleaning Litter Boxes and Components Thereof*, Inv. No. 337–TA–625, Doc. Id. 308398, (ITC Aug. 22, 2008).

"Deposition Testimony of Sabin", In re *Certain Self–Cleaning Litter Boxes and Components Thereof*, Inv. No. 337–TA–625, Doc. Id. 308416, (ITC Aug. 22, 2008).

"Initial Determination Terminating Investigation as to Respondent Doskocil", In re *Certain Self–Cleaning Litter Boxes and Components Thereof*, Inv. No. 337–TA–625, Doc. Id. 308445, (ITC Aug. 25, 2008).

"Transcript, Pre–hearing Conference", In re *Certain Self–Cleaning Litter Boxes and Components Thereof*, Inv. No. 337–TA–625, Doc. Id. 308709, (ITC Aug. 27, 2008).

"Transcript, Hearing", In re *Certain Self–Cleaning Litter Boxes and Components Thereof*, Inv. No. 337–TA–625, Doc. Id. 308710, (ITC Aug. 27, 2008).

"Joint Stipulation Regarding Admissibility of Exhibits Sponsored Through Stipulated Deposition Testimony", In re *Certain Self–Cleaning Litter Boxes and Components Thereof*, Inv. No. 337–TA–625, Doc. Id. 308796, (ITC Aug. 28, 2008).

"Transcript, Hearing", In re *Certain Self–Cleaning Litter Boxes and Components Thereof*, Inv. No. 337–TA–625, Doc. Id. 308860, (ITC Aug. 29, 2008).

"Transcript, Hearing", In re *Certain Self–Cleaning Litter Boxes and Components Thereof*, Inv. No. 337–TA–625, Doc. Id. 308956, (ITC Sep. 2, 2008).

"Complainant's Final Combined Exhibit List", In re *Certain Self–Cleaning Litter Boxes and Components Thereof*, Inv. No. 337–TA–625, Doc. Id. 309851, (ITC Sep. 15, 2008).

"Notice; Decision Not to Review an ID Terminating the Investigation as to One Respondent", In re *Certain Self–Cleaning Litter Boxes and Components Thereof*, Inv. No. 337–TA–625, Doc. Id. 309860, (ITC Sep. 15, 2008).

"Joint Final Exhibit List", In re *Certain Self–Cleaning Litter Boxes and Components Thereof*, Inv. No. 337–TA–625, Doc. Id. 309868, (ITC Sep. 15, 2008).

"Applica and Waters Proposed Conclusions of Law", In re *Certain Self–Cleaning Litter Boxes and Components Thereof*, Inv. No. 337–TA–625, Doc. Id. 309905, (ITC Sep. 15, 2008).

"Complainants' Final Public Exhibit List", In re *Certain Self–Cleaning Litter Boxes and Components Thereof*, Inv. No. 337–TA–625, Doc. Id. 309852, (ITC Sep. 15, 2008).

"Complainants' Final Confidential Exhibit List", In re *Certain Self–Cleaning Litter Boxes and Components Thereof*, Inv. No. 337–TA–625, Doc. Id. 309853, (ITC Sep. 15, 2008).

"Respondents' Rebuttal to Complainant Applica's Proposed Conclusions of Law", In re *Certain Self–Cleaning Litter Boxes and Components Thereof*, Inv. No. 337–TA–625, Doc. Id. 310834, (ITC Sep. 26, 2008).

"Public Version of WRC Response to Respondents'/Staff's Petitions for Review of the Initial Determ", In re *Certain Self–Cleaning Litter Boxes and Components Thereof*, Inv. No. 337–TA–625, Doc. Id. 317569, (ITC Jan. 16, 2009).

"Summary of WRC Response to Respondents' & Staff's Petitions for Review", In re *Certain Self–Cleaning Litter Boxes and Components Thereof*, Inv. No. 337–TA–625, Doc. Id. 317654, (ITC Jan. 21, 2009).

"OurPets Motion to Redact Conditional Petition for Review", In re *Certain Self–Cleaning Litter Boxes and Components Thereof*, Inv. No. 337–TA–625, Doc. Id. 318180, (ITC Jan. 29, 2009).

"Notice to Review a Final ID in Part; Grant a Motion to Strike; and Set a Schedule", In re *Certain Self–Cleaning Litter Boxes and Components Thereof*, Inv. No. 337–TA–625, Doc. Id. 318864, (ITC Feb. 9, 2009).
"Notice, 74 FR 7263", In re *Certain Self–Cleaning Litter Boxes and Components Thereof*, Inv. No. 337–TA–625, Doc. Id. 319321, (ITC Feb. 17, 2009).
"Lucky and Ourpet's Response to Notice to commission Determination to Review a Final ID", In re *Certain Self–Cleaning Litter Boxes and Components Thereof*, Inv. No. 337–TA–625, Doc. Id. 319753, (ITC Feb. 23, 2009).
"Letter to Secretary Regarding Declaration of Alan J. Cook", In re *Certain Self–Cleaning Litter Boxes and Components Thereof*, Inv. No. 337–TA–625, Doc. Id. 319855, (ITC Feb. 24, 2009).
"Complainants Corrected Table of Authorities for Complainants Reply Brief", In re *Certain Self–Cleaning Litter Boxes and Components Thereof*, Inv. No. 337–TA–625, Doc. Id. 320624, (ITC Mar. 9, 2009).
"Notice of Supplemental Authority", In re *Certain Self–Cleaning Litter Boxes and Components Thereof*, Inv. No. 337–TA–625, Doc. Id. 400048, (ITC Mar. 30, 2009).
"Complainants Applica Consumer Products, Inc.'s and Waters Research Company's Response to Respondents' Notice of Supplemental Authority", In re *Certain Self–Cleaning Litter Boxes and Components Thereof*, Inv. No. 337–TA–625, Doc. Id. 400156, (ITC Mar. 30, 2009).
"Final Determination of Violation of Section 337; Issuance of Limited Exclusion Order and Cease and Desist Orders as to Lucky Litter; Termination of Investigation", In re *Certain Self–Cleaning Litter Boxes and Components Thereof*, Inv. No. 337–TA–625, Doc. Id. 400661, (ITC Apr. 8, 2009).
"Final Determination of Violation of Section 337; Issuance of Limited Exclusion Order and Cease and Desist Orders as to OurPet's Company; Termination of Investigation", In re *Certain Self–Cleaning Litter Boxes and Components Thereof*, Inv. No. 337–TA–625, Doc. Id. 400662, (ITC Apr. 8, 2009).
"Letter to the President and the United States Trade Representative Transmitting Limited Exclusion Order", In re *Certain Self–Cleaning Litter Boxes and Components Thereof*, Inv. No. 337–TA–625, Doc. Id. 400688, (ITC Apr. 8, 2009).
"Letter to Mills—Transmittal of Limited Exclusion Order", In re *Certain Self–Cleaning Litter Boxes and Components Thereof*, Inv. No. 337–TA–625, Doc. Id. 402292, (ITC May 1, 2009).
Complaint, *Applica Consumer Products, Inc.* v. *Doskocil Mfg. Co., Inc. et al.*, United States District Court for the Eastern District of Texas, Case No. 2:07–cv–00073 (Docket No. 1, Mar. 8, 2007).
Defendant Doskocil Manufacturing Company, Inc.'s Original Answer and Counterclaims, *Applica Consumer Products, Inc.* v. *Doskocil Mfg. Co., Inc. et al.*, United States District Court for the Eastern District of Texas, Case No. 2:07–cv–00073 (Docket No. 8, Mar. 29, 2007).
Reply to Doskocil Counterclaims, *Applica Consumer Products, Inc.* v. *Doskocil Mfg. Co., Inc. et al.*, United States District Court for the Eastern District of Texas, Case No. 2:07–cv–00073 (Docket No. 15, Apr. 20, 2007).
Applica Consumer Products, Inc.'s Motion for Leave to File a First Amended Complaint, *Applica Consumer Products, Inc.* v. *Doskocil Mfg. Co., Inc. et al.*, United States District Court for the Eastern District of Texas, Case No. 2:07–cv–00073 (Docket No. 23, Jul. 25, 2007).
First Amended Complaint Against Doskocil Manufacturing company, Inc., Lucky Litter LLC, filed by Applica, *Applica Consumer Products, Inc.* v. *Doskocil Mfg. Co., Inc. et al.*, United States District Court for the Eastern District of Texas, Case No. 2:07–cv–00073 (Docket No. 27, Jul. 30, 2007).
Defendant Doskocil Manufacturing Company, Inc's Answer and Counterclaims to First Amended Complaint, *Applica Consumer Products, Inc.* v. *Doskocil Mfg. Co., Inc. et al.*, United States District Court for the Eastern District of Texas, Case No. 2:07–cv–00073 (Docket No. 28, Aug. 9, 2007).
Response to Answer to Amended Complaint, Counterclaim Reply to Doskocil Counterclaims by Applica Consumer Products, Inc., *Applica Consumer Products, Inc.* v. *Doskocil Mfg. Co., Inc. et al.*, United States District Court for the Eastern District of Texas, Case No. 2:07–cv–00073 (Docket No. 29, Aug. 14, 2007).
Standard Protective Order, *Applica Consumer Products, Inc.* v. *Doskocil Mfg. Co., Inc. et al.*, United States District Court for the Eastern District of Texas, Case No. 2:07–cv–00073 (Docket No. 30, Aug. 23, 2007).
Motion to Compel Responses to Discovery by Applica Consumer Products, *Applica Consumer Products, Inc.* v. *Doskocil Mfg. Co., Inc. et al.*, United States District Court for the Eastern District of Texas, Case No. 2:07–cv–00073 (Docket No. 32, Sep. 20, 2007).
Docket Control Order, *Applica Consumer Products, Inc.* v. *Doskocil Mfg. Co., Inc. et al.*, United States District Court for the Eastern District of Texas, Case No. 2:07–cv–00073 (Docket No. 50, Nov. 21, 2007).
Motion to Compel Additional Disclosures Under Paragraph 3of Discovery Order and Renewed Motion to Compel Third Party Discovery, *Applica Consumer Products, Inc.* v. *Doskocil Mfg. Co., Inc. et al.*, United States District Court for the Eastern District of Texas, Case No. 2:07–cv–00073 (Docket No. 61, Jan. 21, 2008).
Applica's Consolidated Response to Defendants' Motions to Stay, *Applica Consumer Products, Inc.* v. *Doskocil Mfg. Co., Inc. et al.*, United States District Court for the Eastern District of Texas, Case No. 2:07–cv–00073 (Docket No. 63, Jan. 31, 2008).
Applica Consumer Products, Inc.'s Corporate Disclosure Statement, *Applica Consumer Products, Inc.* v. *Doskocil Mfg. Co., Inc. et al.*, United States District Court for the Eastern District of Texas, Case No. 2:07–cv–00073 (Docket No. 64, Feb. 4, 2008).
Reply Memorandum of Lucky Litter LLC in Support of Motion to Stay this Action Pursuant to 28 U.S.C. § 1659(a) and the Court's Discretion, *Applica Consumer Products, Inc.* v. *Doskocil Mfg. Co., Inc. et al.*, United States District Court for the Eastern District of Texas, Case No. 2:07–cv–00073 (Docket No. 66, Feb. 8, 2008).
Lucky Litter's Respones to Applica's Motion to Compel Additional Disclosures and Renewed Motion to Compel Third Party Discovery, *Applica Consumer Products, Inc.* v. *Doskocil Mfg. Co., Inc. et al.*, United States District Court for the Eastern District of Texas, Case No. 2:07–cv–00073 (Docket No. 67, Feb. 8, 2008).
Memorandum in Reply to Lucky Litter's Response to Applica's Motion to Compel Additional Disclosures Under Paragraph 3 of Discovery Order and Renewed Motion to Compel Third Party Discovery, *Applica Consumer Products, Inc.* v. *Doskocil Mfg. Co., Inc. et al.*, United States District Court for the Eastern District of Texas, Case No. 2:07–cv–00073 (Docket No. 69, Feb. 19, 2008).

Lucky Litter LLC's Notice of Supplemental Authority in Further Support of Its Motion to Stay—Docket No. 57, *Applica Consumer Products, Inc.* v. *Doskocil Mfg. Co., Inc. et al.*, United States District Court for the Eastern District of Texas, Case No. 2:07–cv–00073 (Docket No. 70, Feb. 25, 2008).

Unopposed Motion for Hearing on Applica's Motion to Compel Responses to Discovery (Document 32) and Applica's Motion to Compel Additional Disclosures Under Paragraph 3 of Discovery Order and Renewed Motion to Compel Third Party Discovery (Document 61), *Applica Consumer Products, Inc.* v. *Doskocil Mfg. Co., Inc. et al.*, United States District Court for the Eastern District of Texas, Case No. 2:07–cv–00073 (Docket No. 73, Feb. 29, 2008).

Memorandum Opinion and Order, *Applica Consumer Products, Inc.* v. *Doskocil Mfg. Co., Inc. et al.*, United States District Court for the Eastern District of Texas, Case No. 2:07–cv–00073 (Docket No. 75, Mar. 31, 2008).

Lucky Litter LLC's Response to First Amended Complaint, *Applica Consumer Products, Inc.* v. *Doskocil Mfg. Co., Inc. et al.*, United States District Court for the Eastern District of Texas, Case No. 2:07–cv–00073 (Docket No. 77, Apr. 21, 2008).

Lucky Litter LLC's Unopposed Request for a Brief Hearing on Its Motion to Stay in This Case, *Applica Consumer Products, Inc.* v. *Doskocil Mfg. Co., Inc. et al.*, United States District Court for the Eastern District of Texas, Case No. 2:07–cv–00073 (Docket No. 80, Jul. 8, 2008).

Order denying Motion for Hear to Stay, *Applica Consumer Products, Inc.* v. *Doskocil Mfg. Co., Inc. et al.*, United States District Court for the Eastern District of Texas, Case No. 2:07–cv–00073 (Docket No. 81, Jul. 10, 2008).

Lucky Litter LLC's Unopposed Motion to Extend Certain Deadlines in Docket Control Order No. 50, *Applica Consumer Products, Inc.* v. *Doskocil Mfg. Co., Inc. et al.*, United States District Court for the Eastern District of Texas, Case No. 2:07–cv–00073 (Docket No. 86, Aug. 13, 2008).

Order for Granting Motion for Extensions of Certain Deadlines, *Applica Consumer Products, Inc.* v. *Doskocil Mfg. Co., Inc. et al.*, United States District Court for the Eastern District of Texaes, Case No. 2:07–cv–00073 (Docket No. 87, Aug. 15, 2008).

Order, *Applica Consumer Products, Inc.* v. *Doskocil Mfg. Co., Inc. et al.*, United States District Court for the Eastern District of Texas, Case No. 2:07–cv–00073 (Docket No. 89, Sep. 16, 2008).

Transcript of Motions Hearing, *Applica Consumer Products, Inc.*v. *Doskocil Mfg. Co., Inc. et al.*, United States District Court for the Eastern District of Texas, Case No. 2:07–cv–00073 (Docket No. 94, Sep. 29, 2008).

First Amended Docket Control Order, *Applica Consumer Products, Inc.* v. *Doskocil Mfg. Co., Inc. et al.*, United States District Court for the Eastern District of Texas, Case No. 2:07–cv–00073 (Docket No. 95, Nov. 7, 2008).

Lucky Litter LLC's Second Amended Answer and First Counterclaims to Amended Complaint, *Applica Consumer Products, Inc.* v. *Doskocil Mfg. Co., Inc. et al.*, United States District Court for the Eastern District of Texas, Case No. 2:07–cv–00073 (Docket No. 100, Jan. 15, 2009).

Order Granting Unopposed Motion for Extension of Time for the Parties to File Joint Claim Construction and Prehearing Statement in Compliance with Patent Rule 4–3, *Applica Consumer Products, Inc.* v. *Doskocil Mfg. Co., Inc. et al.*, United States District Court for the Eastern District of Texas, Case No. 2:07cv–00073 (Docket No. 101, Jan. 16, 2009).

Unopposed Motion for Extension of Time to File Joint Claim Construction and Prehearing Statement Pursuant to Patent Rule 4–3, *Applica Consumer Products, Inc.* v. *Doskocil Mfg. Co., Inc. et al.*, United States District Court for the Eastern District of Texas, Case No. 2:07–cv–00073 (Docket No. 102, Jan. 21, 2009).

Order Granting Unopposed Motion for Extension of Time to File Joint Claim Construction and Prehearing Statement Pursuant to Patent Rule 4–3, *Applica Consumer Products, Inc.* v. *Doskocil Mfg. Co., Inc. et al.*, United States District Court for the Eastern District of Texas, Case No. 2:07–cv–00073 (Docket No. 103, Jan. 23, 2009).

Joint Claim Construction and Prehearing Statement Under P.R. 4–3, *Applica Consumer Products, Inc.* v. *Doskocil Mfg. Co., Inc. et al.*, United States District Court for the Eastern District of Texas, Case No. 2:07–cv–00073 (Docket No. 104, Jan. 26, 2009).

Applica's Answer t Lucky Litter's First Counterclaims, *Applica Consumer Products, Inc.* v. *Doskocil Mfg. Co., Inc. et al.*, United States District Court for the Eastern District of Texas, Case No. 2:07–cv–00073 (Docket No. 105, Jan. 29, 2009).

Notice of United States International Trade Commission's Decisions to Review the Initial Determination and Extend the Deadline by Which its Final Determination Must be Completed, *Applica Consumer Products, Inc.* v. *Doskocil Mfg. Co., Inc. et al.*, United States District Court for the Eastern District of Texas, Case No. 2:07–cv–00073 (Docket No. 109, Feb. 18, 2009).

Agreed Motion to Extend Deadline for the Parties to Comply with P.R. 4–5(a)–(c) and to Submit International Trade Commission Decision and Request to Reset Claim Construction Hearing, *Applica Consumer Products, Inc.* v. *Doskocil Mfg. Co., Inc. et al.*, United States District Court for the Eastern District of Texas, Case No. 2:07–cv–00073 (Docket No. 110, Feb. 24, 2009).

Order Granting Motion to Extend Deadline for the Parties to Comply with P.R. 4–5(a)–(c) and to Submit International Trade Commission Decision and Request to Reset Claim Construction Hearing, *Applica Consumer Products, Inc.* v. *Doskocil Mfg. Co., Inc. et al.*, United States District Court for the Eastern District of Texas, Case No. 2:07–cv–00073 (Docket No. 112 Feb. 25, 2009).

Notice of ITC Decision and Intent of Parties of Appeal, *Applica Consumer Products, Inc.* v. *Doskocil Mfg. Co., Inc. et al.*, United States District Court for the Eastern District of Texas, Case No. 2:07–cv–00073 (Docket No. 117, Apr. 14, 2009).

Status Conference Hearing Minutes, *Applica Consumer Products, Inc.* v. *Doskocil Mfg. Co., Inc. et al.*, United States District Court for the Eastern District of Texas, Case No. 2:07–cv–00073 (Docket No. 122, Apr. 16, 2009).

Notice by Lucky litter LLC, *Applica Consumer Products, Inc.* v. *Doskocil Mfg. Co., Inc. et al.*, United States District Court for the Eastern District of Texas, Case No. 2:07–cv–00073 (Docket No. 123, Apr. 16, 2009).

Joint Motion to Suspend Deadlines Pending Entry of Amended Docket Control Order, *Applica Consumer Products, Inc.* v. *Doskocil Mfg. Co., Inc. et al.*, United States District Court for the Eastern District of Texas, Case No. 2:07–cv–00073 (Docket No. 124, Apr. 16, 2009).

Lucky Litter LLC and Ourpet's Company's Notice Regarding Applica's Notice of Intent to Proceed, *Applica Consumer Products, Inc.* v. *Doskocil Mfg. Co., Inc. et al.*, United States District Court for the Eastern District of Texas, Case No. 2:07–cv–00073 (Docket No. 126, Apr. 24, 2009).

Defendant Doskocil Manufacturing Company, Inc.'s Notice Regarding Applica's Notice of Intent to Proceed, *Applica Consumer Products, Inc.* v. *Doskocil Mfg. Co., Inc. et al.*, United States District Court for the Eastern District of Texas, Case No.. 2:07–cv–00073 (Docket No. 129, Apr. 29, 2009).

Notice of Filing of Official Transcript of Motions Hearing, *Applica Consumer Products, Inc.* v. *Doskocil Mfg. Co., Inc. et al.*, United States District Court for the Eastern District of Texas, Case No. 2:07–cv–00073 (Docket No. 130, May 7, 2009).

Notice of Hearing: Markman Hearing, *Applica Consumer Products, Inc.* v. *Doskocil Mfg. Co., Inc. et al.*, United States District Court for the Eastern District of Texas, Case No. 2:07–cv–00073 (Docket No. 131, Jun. 1, 2009).

Joint Motion to Modify Certain Docket Control Order Deadlines, *Applica Consumer Products, Inc.* v. *Doskocil Mfg. Co., Inc. et al.*, United States District Court for the Eastern District of Texas, Case No. 2:07–cv–00073 (Docket No. 132, Jun. 16, 2009).

Applica's Motion to Enjoin Duplicative Litigation, Motion to Compel, Notice of Collateral Proceeding, and Status Report, *Applica Consumer Products, Inc.* v. *Doskocil Mfg. Co., Inc. et al.*, United States District Court for the Eastern District of Texas, Case No. 2:07–cv–00073 (Docket No. 134, Apr. 16, 2009).

Applica's Motion to Enjoin Duplicative Litigation, Motion to Compel, Notice of Collateral Proceeding, and Status Report, *Applica Consumer Products, Inc.* v. *Doskocil Mfg. Co., Inc. et al.*, United States District Court for the Eastern District of Texas, Case No. 2:07–cv–00073 (Docket No. 135, Jul. 17, 2009).

Response to Defendant Lucky Litter LLC to Applica's Motion to Enjoin Duplicative Litigation and Motion to Compel, *Applica Consumer Products, Inc.* v. *Doskocil Mfg. Co., Inc. et al.*, United States District Court for the Eastern District of Texas, Case No. 2:07–cv–00073 (Docket No. 137, Aug. 3, 2009).

Order granting Joint Motion to Modify Certain Docket Control Order Deadlines, *Applica Consumer Products, Inc.* v. *Doskocil Mfg. Co., Inc. et al.*, United States District Court for the Eastern District of Texas, Case No. 2:07–cv–00073 (Docket No. 138, Aug. 10, 2009).

Applica's Reply to in Support of Its Motion to Enjoin Duplicative Litigation, *Applica Consumer Products, Inc.* v. *Doskocil Mfg. Co., Inc. et al.*, United States District Court for the Eastern District of Texas, Case No. 2:07–cv–00073 (Docket No. 140, Apr. 16, 2009).

Joint Motion for Entry of First Amended Protective Order, *Applica Consumer Products, Inc.* v. *Doskocil Mfg. Co., Inc. et al.*, United States District Court for the Eastern District of Texas, Case No. 2:07–cv–00073 (Docket No. 143, Apr. 16, 2009).

United States District Court Eastern District of Texas Civil Docket for Case No. 2:09–cv–00222–TJW–CE, *Applica Consumer Products Inc.* v. *Petco Animal Supplies Stores Inc. et al.* (Last Viewed Aug. 21, 2009).

United States District Court Eastern District of Texas Docket for Case No. 2:07–cv–00073–CE, *Applica Consumer Products, Inc.* v. *Doskocil Mfg. Inc. et al.*, (Last Viewed Aug. 21, 2009).

United States District Court Eastern District of Texas Civil Docket for Case No. 2:07–cv–00454–CE, *Applica Consumer Products Inc.* v. *OurPet's Company* (Last Viewed Aug. 21, 2009).

United States District Court Northern District of Illinois Civil Docket for Case No. 1:09–cv–03663, *Lucky Litter LLC* v. *Applica Consumer Products, Inc.* (Last Viewed Aug. 21, 2009).

United States Court of Appeals for the Federal Circuit Case Details for Case No. 2009–1292, *Applica Consumer Products, Inc. et al.* v. *International Trade Commission* (Last Viewed Aug. 21, 2009).

Letter Forwarding International Trade Commission Agency Record in Investigation No. 337–TA–625, *Certain Self–Cleaning Litter Boxes and Components Thereof* (Docket No. 403861, May 26, 2009).

"Lucky Litter's Amended Notice of Prior Art Pursuant to Order No. 6 and Rule No. 5", International Trade Commission Investigation No. 337–TA–625, *Certain Self–Cleaning Litter Boxes and Components Thereof* (Docket No. 301020, May 20, 2008).

"Lucky Litter's Second Amended Notice of Prior Art Pursuant to Order No. 6 and Rule No. 5", International Trade Commission Investigation No. 337–TA–625, *Certain Self–Cleaning Litter Boxes and Components Thereof* (Docket No. 306245, Jul. 29, 2008).

"Respondent Doskocil Manufacturing Company, Inc.'s Notice of Prior Art and Tentative Witness List", International Trade Commission Investigation No. 337–TA–625, *Certain Self–Cleaning Litter Boxes and Components Thereof* (Docket No. 300266, May 14, 2008).

"Commission Investigative Staff's Notice of Prior Art", International Trade Commission Investigation No. 337–TA–625, *Certain Self–Cleaning Litter Boxes and Components Thereof* (Docket No. 300146, May 13, 2008).

"Respondent Ourpet's Company's Notice of Prior Art", International Trade Commission Investigation No. 337–TA–625, *Certain Self–Cleaning Litter Boxes and Components Thereof* (Docket No. 300248, May 13, 2008).

"Complainants Applica Consumer Products , Inc. and Waters Research Company's Notice of Art Pursuant to Ground Rule 5", International Trade Commission Investigation No. 337–TA–625, *Certain Self–Cleaning Litter Boxes and Components Thereof* (Docket No. 300250, May 13, 2008).

"Lucky Litter's Notice of Prior Art Pursuant to Order No. 6 and Ground Rule No. 5", International Trade Commission Investigation No. 337–TA–625, *Certain Self–Cleaning Litter Boxes and Components Thereof* (Docket No. 300144, May 13, 2008).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent, but was deleted by the reissue patent; matter printed in italics was added by the reissue patent. Matter enclosed in heavy double brackets, [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

Claims 27, 33, 41 and 42 are cancelled.

New claim 49 is added and determined to be patentable.

Claims 1-26, 28-32, 34-40 and 43-48 were not reexamined.

49. A self-cleaning cat litter box comprising:

a pan-shaped housing having opposed side walls extending lengthwise along the housing and end walls interconnecting the side walls;

an upwardly opening litter chamber defined by the pan-shaped housing and having an open top and a bottom thereof;

a litter level line extending along at least one of the housing walls at a predetermined distance above the bottom and below the top of the litter chamber to indicate the level to which litter is to be filled in the litter chamber;

a comb extending between the opposed side walls for being moved along the open top of the litter chamber and the side walls of the housing from a storage position to a discharge position so that the comb moves while the housing remains stationary;

tines of the comb that extend downward into the litter chamber below the litter level line so that the tines move through the litter to engage clumps therein for moving the clumps toward the discharge position;

a comb drive coupled to the housing and including a motor and gear train that cooperate to drive the comb between the storage and discharge positions thereof; and a mode selector switch for selecting between at least two operating modes of the comb drive including (1) a manual operation mode wherein litter combing is initiated when an operator sets the mode selector switch to the manual operation mode to allow the operator to control when the litter is to be cleaned, and (2) an automatic operation mode wherein litter combing is initiated after a predetermined time interval has passed after a cat exits out through the open top of the upwardly opening litter chamber to avoid motor operation and comb movement when the cat still may be near the pan-shaped housing, wherein the litter level line comprises a ridge extending along the one housing wall.

* * * * *